United States Patent
Gosselin

(10) Patent No.: US 8,973,461 B2
(45) Date of Patent: Mar. 10, 2015

(54) JOINTED LIMB COMPRISING FIBRES, AND JOINTED STRUCTURE AND ROBOT OR HAPTIC INTERFACE COMPRISING SUCH A JOINTED LIMB

(75) Inventor: Florian Gosselin, Vanves (FR)

(73) Assignee: Commissariat a l'Energie Atomique, Paris (FR)

( * ) Notice: Subject to any disclaimer, the term of this patent is extended or adjusted under 35 U.S.C. 154(b) by 496 days.

(21) Appl. No.: 12/375,873

(22) PCT Filed: Jul. 27, 2007

(86) PCT No.: PCT/EP2007/057796
§ 371 (c)(1),
(2), (4) Date: Jan. 30, 2009

(87) PCT Pub. No.: WO2008/015178
PCT Pub. Date: Feb. 7, 2008

(65) Prior Publication Data
US 2009/0260473 A1   Oct. 22, 2009

(30) Foreign Application Priority Data
Jul. 31, 2006   (FR) ...................................... 06 53208

(51) Int. Cl.
*B25J 17/00* (2006.01)
*B25J 13/02* (2006.01)
*E05D 1/02* (2006.01)

(52) U.S. Cl.
CPC ... *B25J 13/02* (2013.01); *E05D 1/02* (2013.01)
USPC ...................................................... 74/490.05

(58) Field of Classification Search
USPC ......... 74/490.01, 490.05, 490.06; 901/27, 28, 901/29
See application file for complete search history.

(56) References Cited

U.S. PATENT DOCUMENTS

| | | | |
|---|---|---|---|
| 5,945,053 A | 8/1999 | Hettinga | |
| 6,149,998 A * | 11/2000 | Hettinga | ........................ 428/44 |
| 6,247,738 B1 * | 6/2001 | Winkel et al. | ................ 294/111 |
| 6,470,205 B2 * | 10/2002 | Bosselmann et al. | ......... 600/424 |
| 7,474,198 B2 | 1/2009 | Gosselin et al. | |
| 7,582,345 B2 * | 9/2009 | Priegelmeir et al. | ............ 428/60 |
| 7,654,595 B2 | 2/2010 | Yokoyama et al. | |

(Continued)

FOREIGN PATENT DOCUMENTS

| FR | 2756028 | 5/1998 |
|---|---|---|
| FR | 2775927 A | 9/1999 |

(Continued)

OTHER PUBLICATIONS

Arai et al., "Development of 3 DOF Micro Finger" Proceedings of the 1996 LEEE/RSJ International Conference on Intelligent Robots and Sytems, (IROS 96) Osaka, Japan, IEEE, US, vol. 2, Nov. 4, 1996, pp. 981-987.

(Continued)

*Primary Examiner* — Vicky Johnson
(74) *Attorney, Agent, or Firm* — Miles & Stockbridge P.C.

(57) ABSTRACT

The primary object of the present invention is a jointed and instrumented limb for robot or haptic interface comprising at least first (2) and second (4) rigid segments and a joint (6), said joint (6) comprising fibers and at least one measurement element (101, 102) and being fixed in each of the rigid segments (2, 4).

The present invention also has for object a robot or a haptic interface comprising at least one such jointed limb.

15 Claims, 22 Drawing Sheets

(56) References Cited

U.S. PATENT DOCUMENTS

2004/0138700 A1* 7/2004 Cooper et al. ............... 606/205
2007/0156019 A1* 7/2007 Larkin et al. ................. 600/104

FOREIGN PATENT DOCUMENTS

FR          2863535       12/2003
WO     WO 2004/000508 A1  12/2003

OTHER PUBLICATIONS

Dong et al., "Stiffness Influence Atlases of a Novel Flexure Hinge-Based Parallel Mechanism with Large Workspace", Proceedings of the 2005 IEEE/RSJ International Conference on Intelligent Robots and Systems, (IROS 2005) Edmonton, Alberta, Canada, Aug. 2-6, 2005, Piscataway, NJ, USA, IEEE, Aug. 2, 2005, pp. 796-801, XP-010857174.

"Compliant Prosthetic or Robotic Joint" NTIS Tech Notes, US Department of Commerce, Springfield, VA, May 1, 1990, p. 425, XP000137392.

Biagiotti et al., "Innovative Design of Robot Hands for Space Activities", $8^{th}$ ESA Workshop on Advanced Space Technologies for Robotics and Automation, ASTRA 2004, ESTEC—Noordwijk, The Nederlands, Nov. 2-4, 2004.

Lotti et al. "UBH 3: An Anthropomorphic Hand with Simplified Endo-Skeletal Structure and Soft Continuous Fingerpads", IEEE International Conference on Robotics & Automation, New Orleans, LA, Apr. 2004, pp. 4736-4741.

Office Action (Notification of Reasons for Rejection) issued May 15, 2012, in Japanese Patent Application No. 2009-522238.

* cited by examiner

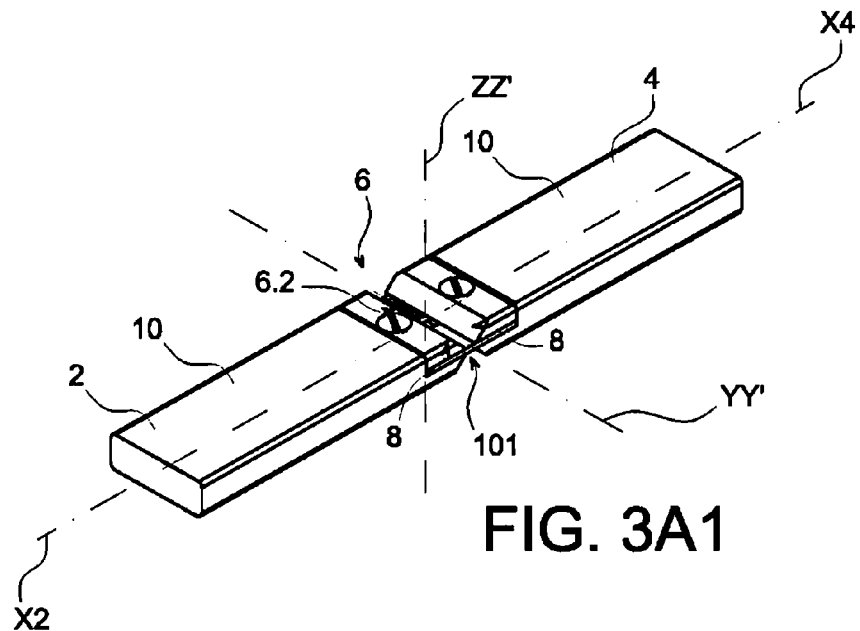
FIG. 3A1
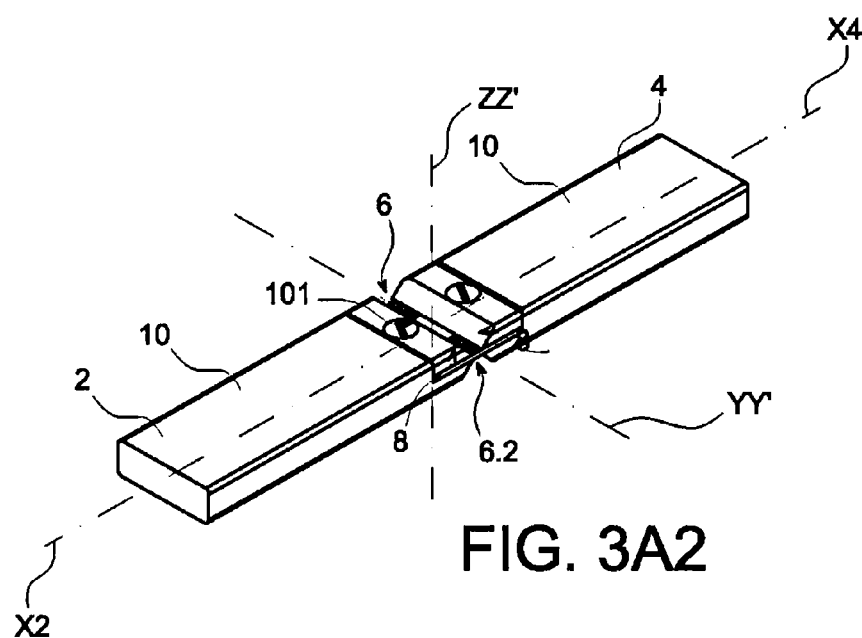
FIG. 3A2

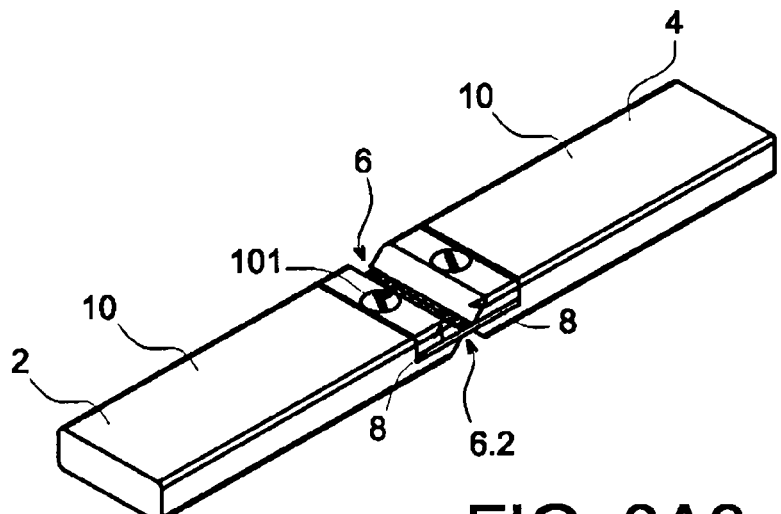
FIG. 3A3
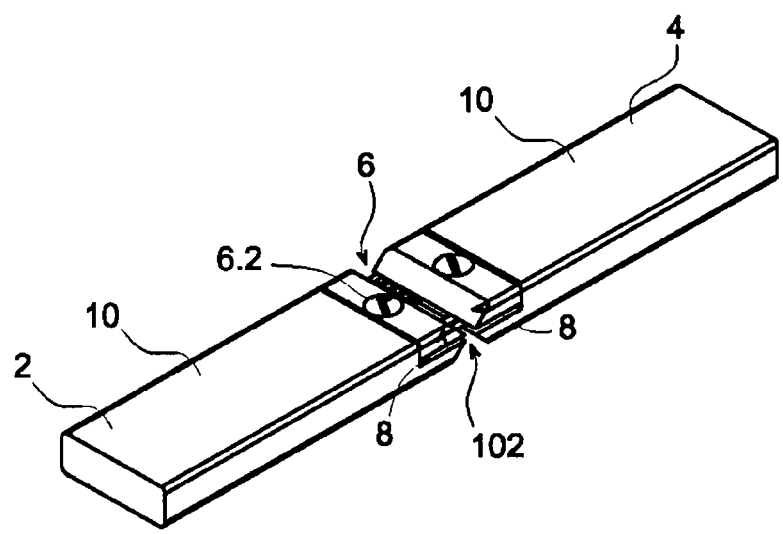
FIG. 3A4

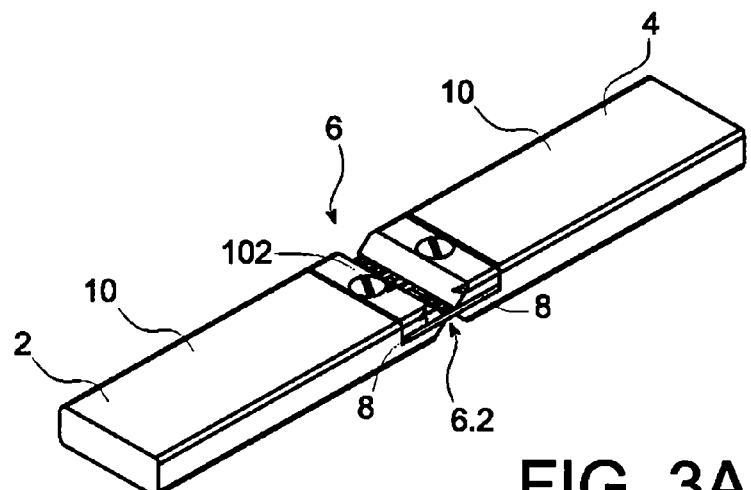
FIG. 3A5
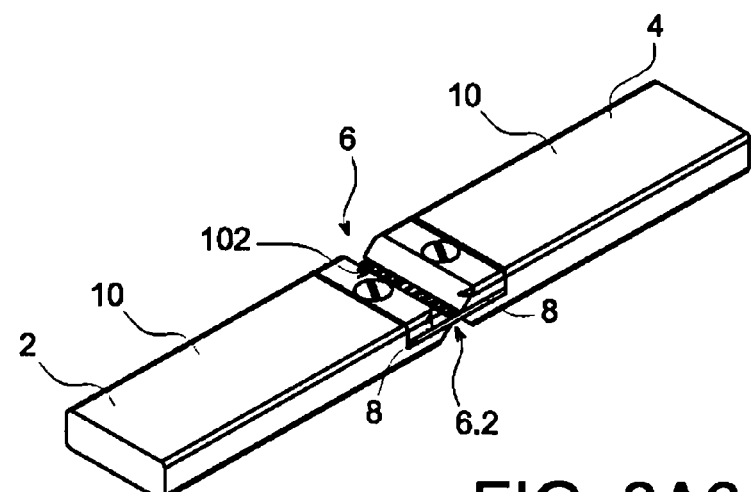
FIG. 3A6

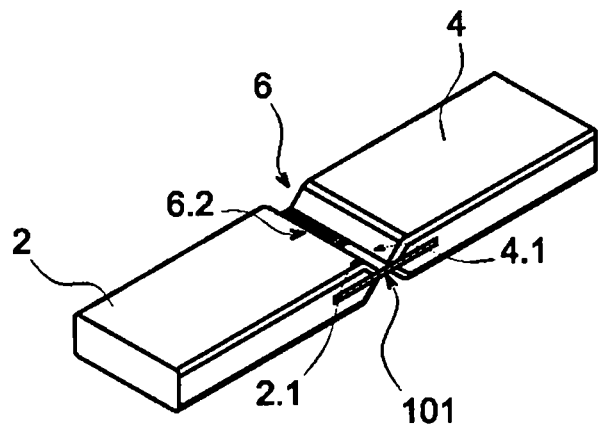
FIG. 3B1
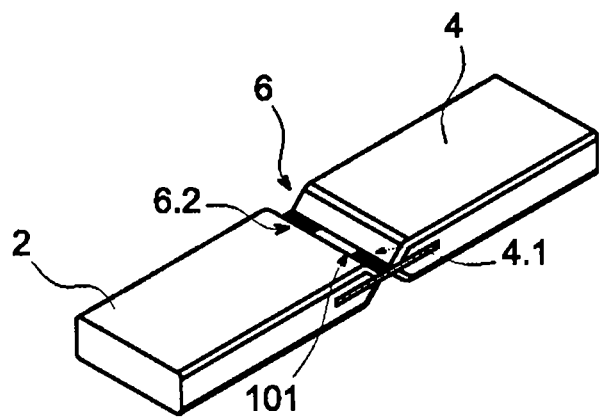
FIG. 3B2

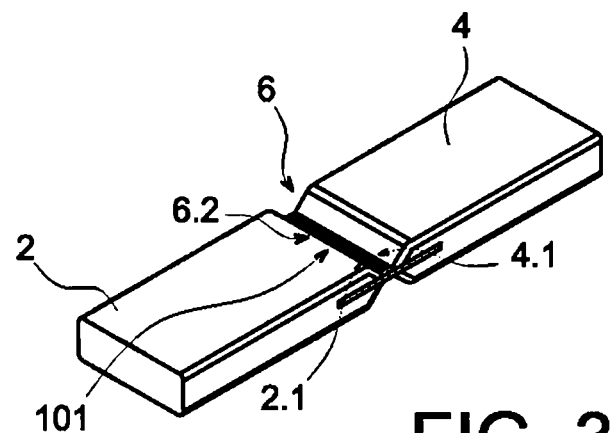
FIG. 3B3
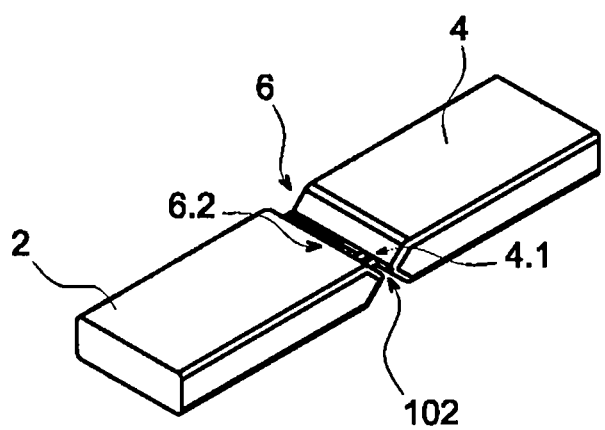
FIG. 3B4

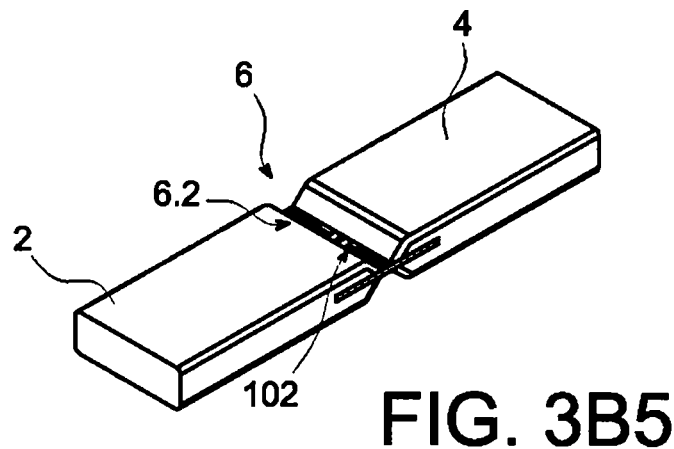
FIG. 3B5
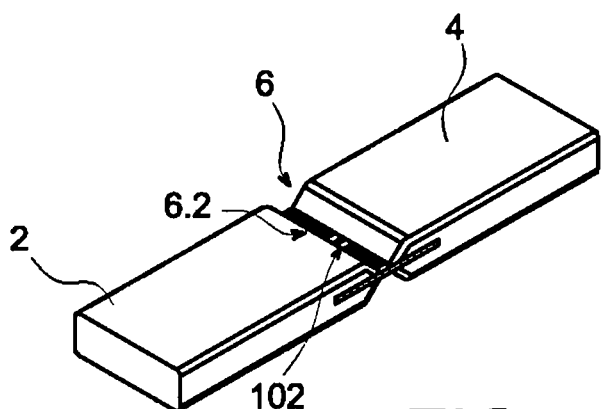
FIG. 3B6

JOINTED LIMB COMPRISING FIBRES, AND JOINTED STRUCTURE AND ROBOT OR HAPTIC INTERFACE COMPRISING SUCH A JOINTED LIMB

TECHNICAL FIELD AND PRIOR ART

The present invention relates to a jointed limb for robot or for haptic interface and to robots and haptic interfaces implementing at least one such jointed limb.

Most of the known robots and haptic interfaces use a jointed kinematic chain made up of several mobile bodies connected to each other by joints connecting a fixed base to one or several effector(s) in the case of a manufacturer robot or to one or several gripper(s) grabbed by the user in the case of a force feedback interface.

These poly-jointed chains make it possible to control the position and/or the orientation of the end member relative to the base.

The joints of most of the existing robots are realized based on ball bearings or journal bearings. This solution makes it possible to optimize effort transmission performances while also minimizing play and friction. However, this type of joint implements many mechanical parts which require precise adjustment in order to ensure proper operation of the joint. These joints are therefore complex and costly. Moreover, they are generally heavy and bulky relative to the size of the robot.

Moreover, in the field of micro and meso technologies, this type of ball bearing or journal bearing joint is difficult to implement due to the size of the devices produced in this field.

In order to free oneself from the problems of manufacturing and assembly on a small scale, single-piece joints were manufactured. These single-piece joints are easy to produce and do not require any assembly; they therefore represent interesting solutions from an economic perspective and, moreover, they make it possible to avoid the flaws of hinged structures, in particular play and wear.

However, this type of single-piece joint has the drawback of having limited movement. Moreover, they are not particularly well adapted to the macroscopic scale for robots, efficiency being limited, since part of the energy is used to deform the joint, and they are also not adapted to haptic interfaces because the joints behave like springs with multiple degrees of freedom and therefore offer resistance to the movements one seeks to impose on them. Thus, the return reaction is not representative of the information on the action performed by the device remotely controlled.

To offset these drawbacks, it has been proposed to produce joints with thinned down areas, therefore offering less resistance to movement. However, this thinning leads to local embrittlement. Moreover, travel remains limited as it is necessary to stay within the elastic field of the material.

Also known from the article "Stiffness Influence Atlases of a Novel Flexure Hinge-based Parallel Mechanism with Large Workspace", Proceedings of the 2005 IEEE/RSJ International Conference on Intelligent Robot and Systems, 2-6 Aug. 2005, Edmonton, Alberta, Canada, pp 796-801, is a parallel robot comprising six branches connected to base actuators and to a mobile platform by metal rods connected to the adjacent body by two screwed parts. However, the metallic rods used behave like springs and serve directly to transmit efforts. Moreover, they remain fragile.

Also known from the document "Innovative Design of Robot and for Space Activities" L. Biagotti and Al, 8th ESA Workshop on Advanced Space Technologies for Robotics and Automation, <<ASTRA 2004>>, ESTEC-Noordwijk, The Nederlands, 2-4 Nov. 2004, is a robotized hand with flexible joints, the joints being formed by spiral springs which also offer resistance to movement.

In conclusion, certain joints of the prior art use an assembly of several components to ensure the mobility of one part relative to another. One of course obtains a quality hinge; however, it is complex, with a significant weight and bulk.

There are also flexible single-piece structures which use only one part, however, they cause resistance to movement due to a non-null rigidity around the considered joint axis. Moreover, travel is limited and they suffer a certain fragility.

There are also other joints, of the spring type, which oppose resistance to movement and are therefore not adapted to haptic interfaces.

Another drawback of the robot or haptic interface joints is that they rarely integrate movement measurement. This measurement is generally offset and done at the level of the motors. This co-localization of the motors and the measurement makes it possible to optimize adjustments of closed-loop controls. However, the motors in general being connected to reduction gear in order to increase the levels of available efforts, measurement over one motor revolution does not make it possible to know, upon start-up of the robot, the configurations of its joints because due to the gear reduction introduced by the reduction gears, there are several joint positions corresponding to each position of the coder arranged on the motor. Thus the measurement is relative and not absolute. The result is that it is necessary to initialize the system by placing it in a reference start-up configuration making it possible to recalibrate the movement measurements relative to this starting configuration. This procedure slows start-up of the system and therefore is damaging to its ergonomy. Moreover, the measurements being done at the motors, the passive (not motorized) joints are in general not equipped with position sensors. On parallel robots, this absence requires the resolution of complex mathematical models in order to determine the position of the end member of the robot according to the positions of the joints.

Document FR 2 756 028 describes an automotive self-locking articulated joint made up of an elastic strip provided with a stress plate and a layer of viscoelastic material. This joint is designed to allow passage between two stable positions and to lock the joint in these two stable positions. These are namely a folded stable position and an unfolded stable position. But this joint offers resistance to movements; it is therefore not "transparent" and therefore cannot be applied to haptic interfaces.

Moreover, this type of joint does not make it possible to realize multi-position joints, since the joint described in this document allows only two stable positions. Moreover, it does not integrate any means for measuring the position of the joint, this simply putting it in one or the other of its stable positions.

As a result, it is the aim of the present invention to offer a joint for jointed limbs with a simple design, enabling great travel while also offering significant solidity, and opposing only a weak resistance effort during actuation of the joint, and integrating means for measuring its deformation.

It is also the object of this invention to propose the use of this type of joint on a robot or a haptic interface, which makes it possible to free oneself from the initialization phase of the system by having an absolute measurement of the position of the bodies of the robot in addition to the measurement relative to the movements of the motors, this measurement being obtained for the active and passive joints, which simplifies the models of parallel robots.

BRIEF DESCRIPTION OF THE INVENTION

The aim previously stated is obtained thanks to a composite joint realized in a material different from the segments produced in a rigid material, which it connects and which it hinges one in relation to the other. The joint material is chosen for its flexibility, thereby making it possible to minimize resistance to movements and its solidity.

The material chosen is a fibrous material. This type of material offers only a very low resistance to movements, great solidity, in particular in the direction of the fibers. Moreover, it is easy to manufacture and easy to assemble, with the segments of the limb to be produced.

In other words, the limb comprising the joint according to the present invention is produced by separating, in space, the properties of the materials. This is to say that the flexible limb is composite, since it comprises several distinct materials in the space, the segments of the limb are produced in a rigid material, while the joint in itself is made in a flexible material.

Moreover, the joint integrates elements for measuring the deformation of the fibrous material which are localized in the joint itself between the rigid bodies connected by the connection.

The production of the joint itself in fibrous material, of the cable type, or woven material or non-woven material, allows great transparency of efforts around the joint axis, i.e. this joint offers very low resistance to movements and little or no stiffness or damping, while also offering very great solidity.

The measurement elements themselves are made in a flexible material of the fiber, polymer or rubber type so as to enable measurement without opposing resistance to movement and while preserving the transparency of the joint.

According to the present invention, the joint and the measurement means are fixed in the segments of the limb, which offers great simplicity of realization, great compactness and great connection solidity between the two segments of the jointed limb.

The fixing inside of the segments has two primary advantages. First of all, the axis of the joint is found in the middle plane of the fibrous material, which therefore folds around its neutral fibers, which offers less resistance. If it was fixed to the outside, two strips of fibrous material would be necessary on each of the two faces of the adjacent segments in order to obtain equivalent solidity in both directions, the use of a single strip on one of the faces of the segments risking favoring one direction. Under these conditions, given the fact that the adjacent segments cannot be completely pointed, the fibrous strips would go further from the axis of the joint, which would require a greater free length in order to be able to ensure the movement of the joint, therefore more parasitic movements in the other directions. Secondly, this arrangement increases the solidity of the joint because it is more difficult to pull the fibrous strip out of the middle of the segments than from their edges.

Lastly, fixing the measurement elements in the joint makes it possible to determine its movements in a very compact design.

This fixing can be obtained by molding the segments of the jointed limb around the fibrous joint and the measurement means, or by fixing, by clamping or crimping, the ends of the fibrous joint and of the measurement means in the segments of the jointed limb. One or the other of these solutions will be chosen according to the material used to produce the segments. Moreover, one can consider, in order to further improve the solidity of the connection, performing a molding and confirming the fixing with inserts penetrating into loops formed by the fibrous material.

The fibrous materials can for example be cables, the joint being able to comprise one or several cables according to the number of degrees of freedom one wishes to give to the joint, and according to the connection solidity between the two segments.

The measurement elements can for example be two fine electrodes 150 deposited on a fine element in flexible polymer, the deformation of which will lead to a variation of the distance between the electrodes 150, therefore of the resistance or the capacity of the device. This principle is known by those skilled in the art and is used for example in the Pads of portable computers. It therefore will not be described in detail. The measurement elements can also be made of a flexible plastic material charged with metallic particles or a conductor polymer the resistance of which varies according to its deformation. They can also be realized using one or several optical fibers connected to a light emitter (diode) and whereof the capacity to transmit light will be modified by the curve which will therefore be indirectly detected and measured by a photodetector.

The joint can ideally be made in a woven material or a non-woven material, produced by the cohesion of fibers arranged orderly or not.

The ordering of the fibers, in particular in the case of cables, woven materials and nonwoven materials with alignment of the fibers, the fibers being oriented in the direction of the alignment of the two segments, makes it possible to increase the traction behaviour between the two segments.

The subject-matter of the present invention is therefore mainly a jointed limb for robot or haptic interface comprising at least first and second rigid segments and a joint, said joint comprising fibers and measurement elements and being fixed in each of the rigid segments.

This jointed limb is simple and robust to produce, offers great travel and very little resistant effort during jointing of the first segment relative to the second segment, thus in the case of implementation in a haptic interface the effect is of very good quality.

In one embodiment, the joint comprises at least two cables, parallel to each other, whereof one larger dimension is orthogonal to the axis of rotation of the joint, the cables being flexed. The joint also comprises an element for measuring the angle it forms, this measurement element being able to be in the form of fiber (optical, for example) or a fine sheet of flexible material integrating electrodes or metallic particles such that its resistance or its capacity varies according to the curve of the joint. This measurement element can be placed next to the cables or in the middle of them. This joint has the advantage of being very simple to produce and offering a very long lifetime, and it also benefits from the great ability in bending of the cables. Moreover, the cost is very low relative to the joints of the prior art.

In another embodiment, the joint can comprise a single cable able to enable ball fitting between the first and second segments. Thus in a simple manner, a ball and socket joint connection is realized without requiring a precise adjustment between two parts.

In another example, the joint can be of the universal type, comprising a journal cross whereof the ends of a first branch are jointed using a cable on two first segment branches and whereof the ends of a second branch are jointed using a cable on two branches of the second segment.

In another embodiment, the joint can comprise a cable whereof one larger dimension of the cable extends along the axis of rotation of the joint, thus the cable is solicited in torsion. In this case, one can choose as measurement elements a wire of flexible material (polymer, nylon, . . . ) collinear or parallel to and near the joint cable and the physical characteristics of which vary according to its torsion if it is collinear to the joint or its lengthening if it is parallel and slightly offset. The polymer can for example be loaded with metallic particles, possibly inhomogenously and in favored directions, such that its resistance varies according to its deformations, therefore the movement of the joint.

The joint can also comprise a sheet of fibers. Advantageously, this sheet comprises woven fibers, which makes it more resistant. In this case as on the wire-based embodiment, the measurement elements can be placed next to the sheet of fibers or be integrated directly into it.

Moreover, the fibers can be submerged in the material of the segments. The production of a jointed limb according to the present invention is therefore very simple.

Advantageously, it can be provided that the ends of the joint submerged in the material comprise loops through which the material passes in order to improve the mechanical resistance of the fastener of the joint in the segments.

One can also provide that the axes go through the loops and are also submerged in the material.

In another variation, the joint is fixed by tightening in the segments, which makes it removable.

Very advantageously, the ends of the segments across from it are beveled, increasing the angular travel between the segments.

The fibers of the joints are for example in aramid fiber, Kevlar or polypropylene, which grants them very good mechanical behaviour.

The jointed limb according to the present invention can also comprise means for actuating one of the segments in relation to the other, said actuation means for example connecting a motor and a reduction gear or cable capstan. The actuation means can be provided with their own measurement means such as, for example, a potentiometer or an optical coder.

The subject-matter of the present invention is also a jointed structure comprising a base provided with two ends, a mobile support mounted jointed on the base, the support forming, with the base, a jointed limb according to the present invention, a jointed parallelogram comprising an arm, a connecting rod parallel to the arm and first and second parallel small connecting rods, the arm being jointed on the mobile support, the arm and the mobile support forming a jointed limb according to the present invention, the first small connecting rod being jointed on the arm and the connecting rod, the arm and the first small connecting rod, the connecting rod and the first small connecting rod respectively forming jointed limbs according to the present invention and the second small connecting rod being jointed on the connecting rod and the arm, the second small connecting rod and the arm forming a jointed limb according to the present invention and the second small connecting rod and the connecting rod forming a jointed limb according to the present invention, the second small connecting rod extending so as to form a operation forearm.

The subject-matter of the present invention is also a robot or haptic interface comprising at least one jointed limb according to the present invention.

The subject-matter of the present invention is also a robot or haptic interface comprising two structures according to the present invention, arranged head to tail, such that the free ends of the two operation forearms are across from each other and on which is jointed an element forming a jointed limb according to the present invention.

The subject-matter of the present invention is also a robot or haptic interface comprising two structures according to the present invention, arranged side by side, the free ends of the two operation forearms being jointed on an element forming a jointed limb according to the present invention.

The subject-matter of the present invention is also a robot or haptic interface comprising three structures according to the present invention, distributed angularly around an axis preferentially regularly, the ends of the forearms all being oriented from a same side and bearing a platform, which can form, with the ends of the forearms, jointed limbs according to the present invention.

The subject-matter of the present invention is also a robot or haptic interface comprising a base, on which are arranged, in mobile manner, three supports turning around three axes regularly distributed angularly, each support forming, with the base, a jointed limb according to the present invention, said robot comprising three first jointed segments on the mobile supports, forming jointed limbs according to the present invention with them, three second segments jointed by a first end respectively on the three first segments, said second segments forming, with said first segments, jointed limbs according to the present invention, said second segments supporting, at their second end, a platform, which can be formed with the second ends of the second segments of the jointed limbs according to the present invention.

The subject-matter of the present invention is also a robot or haptic interface comprising two structures or three structures according to the present invention, arranged on a shared base fixed to the back of the hand, such that the free ends of the two operation forearms are manipulated with the ends of two or three fingers.

BRIEF DESCRIPTION OF THE DRAWINGS

The present invention will be better understood with the help of the following description and the appended drawings, in which:

FIG. 1A-1 is a detailed view of the joint of FIG. 1A illustrating electrodes on upper and lower faces of a flexible film thereof, FIG. 1A-2 is a detailed view of the joint of FIG. 1A illustrating stress gauges of a flexible film thereof.

DETAILED DESCRIPTION OF SPECIFIC EMBODIMENTS

Throughout the entire description, the same references will be used to designate elements serving the same function.

The terms "horizontal", "vertical", "below", ... will not be limiting since the described devices can be arranged according to any spatial orientation.

Figure 1A:
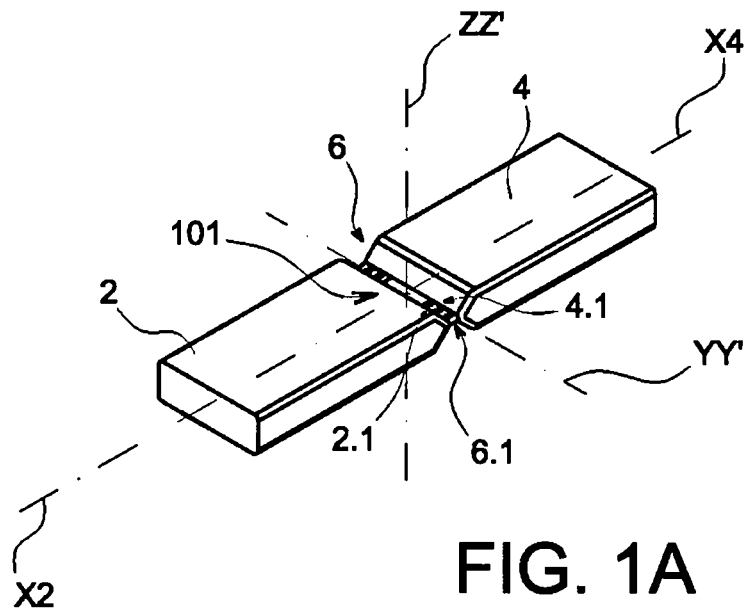
FIG. 1A is a perspective view of a first example of a first embodiment of a jointed limb according to the present invention whereof the joint is flexed.

In FIG. 1A one can see a first example of embodiment of a limb according to the present invention, comprising a first 2 and a second 4 rigid segment, with axes X2 and X4, respectively, connected such that their bases are substantially aligned by a joint 6.

The joint 6 in this first embodiment comprises a plurality of cables 6.1 arranged in the direction of their length according to the direction of the axes X2 and X4.

In this embodiment, the joint comprises five cables 6.1, but a larger or smaller number of cables can be used depending on the size of the segments and according to the desired connection resistance between the two segments.

According to the present application, a cable is a cording of metallic fibers, natural or synthetic fibers, which is formed by an assembly of strands. The strands can themselves be wound around a core.

The cables can be realized in steel, aramid fiber, Kevlar, polypropylene or any other material able to offer the desired mechanical resistances for such a joint and great resistance to fatigue.

The joint also comprises a measurement element 101 in the form of a thin flexible film. This measurement element can for example be made up of two fine electrodes deposited on a fine element in flexible polymer whereof the deformation will lead to a variation of the distance between the electrodes, therefore of the resistance or the capacity of the device. It can also be formed from a flexible plastic or conductive polymer material (charged with metallic particles, for example) whereof the resistance varies depending on its deformation. These principles are known by those skilled in the art and will not be described in detail here. We will not in particular present the electronic and computer processing elements for signals representing the resistance or the capacity of the device and which must be processed in order to reconstruct an image of the deformation of the material, therefore the angle of the joint. For simplification, these elements, as well as the power and cabling elements of the measurement elements, will not be illustrated.

In this embodiment, the longitudinal ends of the cables and of the measurement elements are submerged in the material forming the segments 2 and 4. This is obtained during molding of the segments 2 and 4 by placing the cables 6.1 and the measurement element 101 and its cabling (not illustrated) in the molds.

The cables have great axial rigidity and great ability in bending and torsion; they then allow significant rotational movement around an axis YY' perpendicular to the axes X2 and X4 while blocking the other movements. Moreover, their fixing is much simpler than that of the journal or ball bearings used in the prior art, since it is sufficient for example to submerge them in the mass of the material forming a segment.

The measurement element is very compact and very flexible and does not offer resistance to the movements of the joint. It makes it possible to know the position of the joint at any moment. The cables are placed on the sides of the measurement element to increase the resistance of the joint, in particular to parasitic movements other than the rotation around the axis YY'.

Figure 1B:
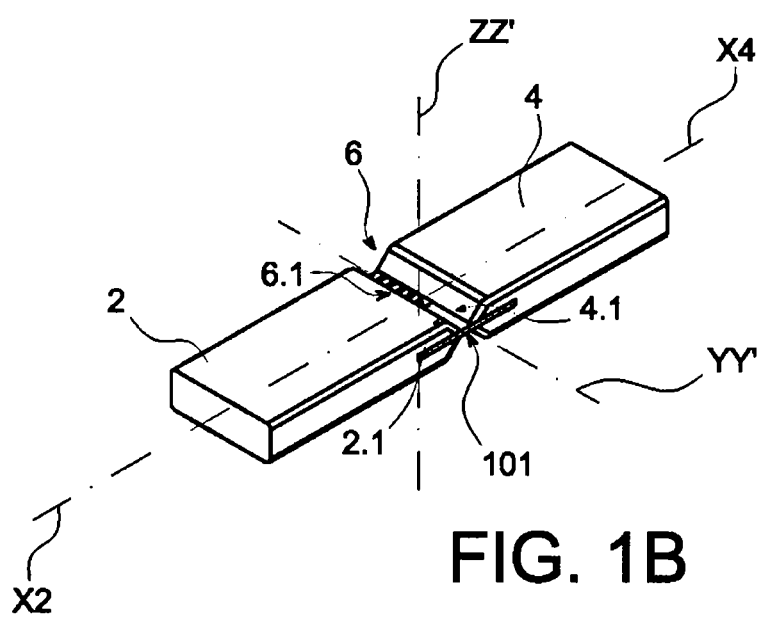
FIGS. 1B to 1D are variations of the joint of FIG. 1A.

FIG. 1B presents a variation of this embodiment. In this figure, the measurement element 101 is placed from one side of the rigid bodies 2 and 4 while the cables 6.1 are placed from the other side. This configuration can also be used to facilitate the integration of the cables and the measurement element.

Figures 1, 1A:
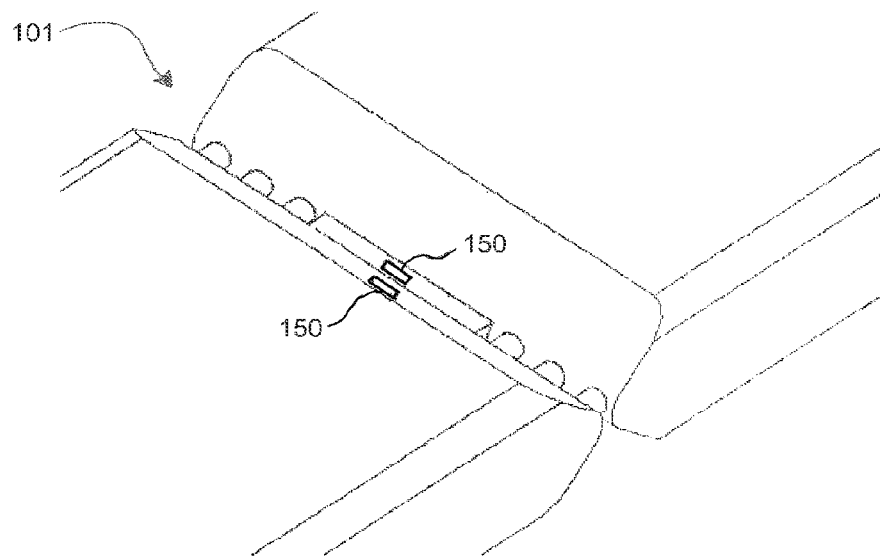
Figures 1, 1A, 2:
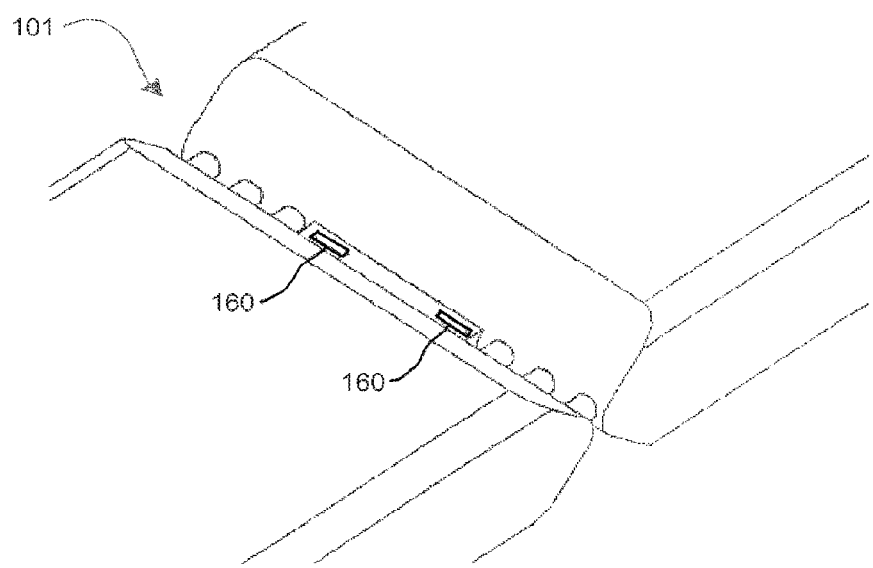
Figure 1C:
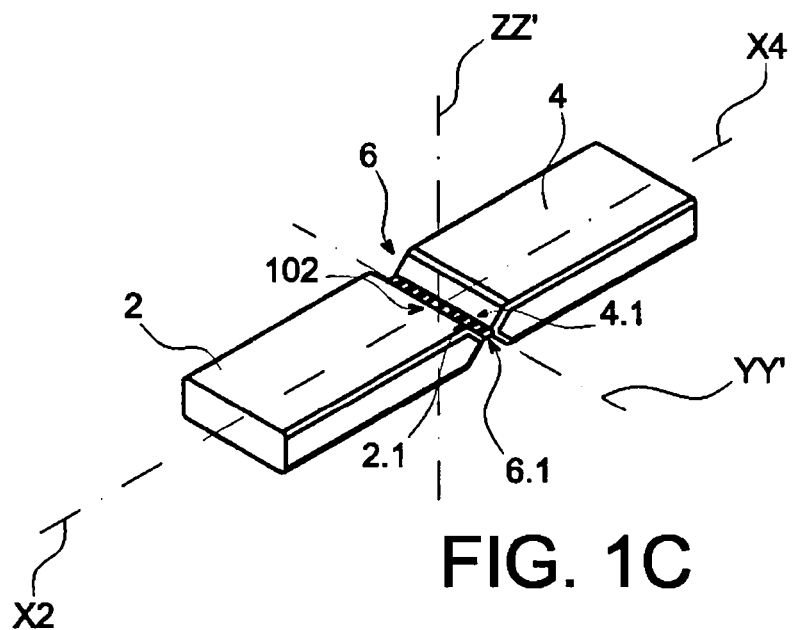

FIG. 1C presents another variation of embodiment of the joint of FIG. 1a. Here the measurement element 102 is present in the form of flexible wires. It can still be formed in conductive polymer or flexible material charged with metallic particles whereof the resistance varies according to the movements of the joint. It can also be formed by one or several optical fibers connected to a transmitter (for example a diode) and a receiver (for example a photodiode). In this case, the quantity of light transmitted through the fiber varies according to its curvature and the measurement of the quantity of light received by the receiver provides an image of the angle of the joint. This kind of device is also known by those skilled in the art and will not be described in detail in this document. In particular, the wires and electrical and electronic circuits connected to the power of the light source and the transport of the signals of the receiver will not be illustrated in FIG. 1C.

Figure 1D:
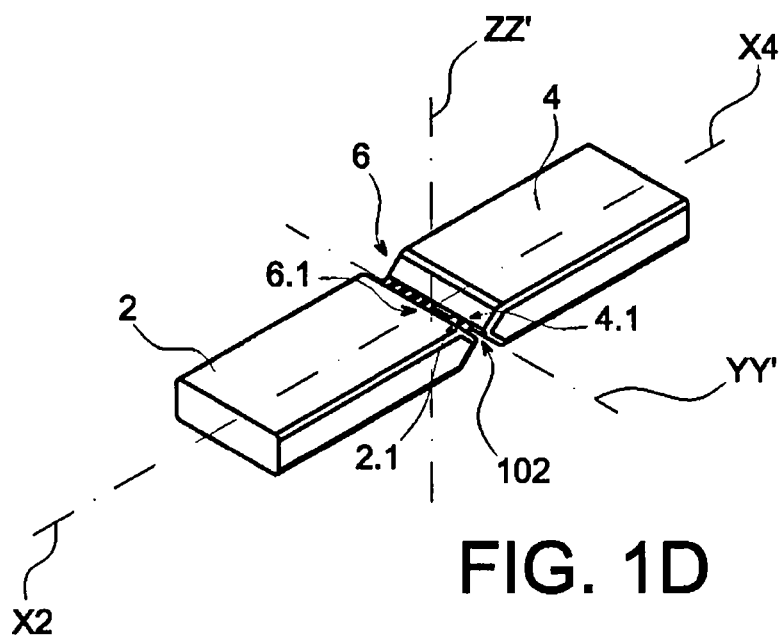
Figure 2A:
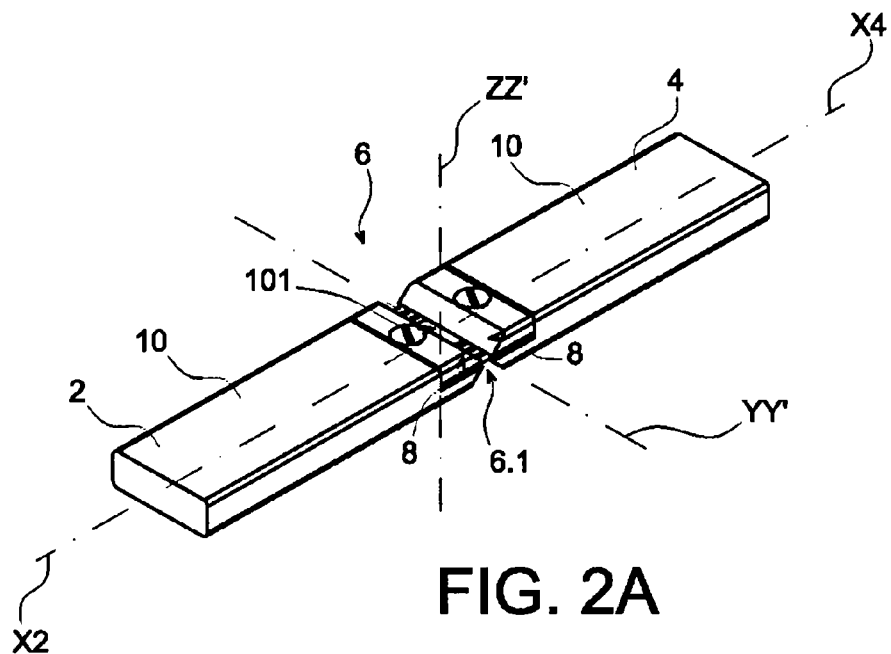
FIG. 2A is a variation of the jointed limb of FIG. 1, FIGS. 2B to 2D are variations of the joint of FIG. 2A, FIGS. 3A1 to 3A6 and 3B1 to 3B6 are perspective views of a second embodiment of a jointed limb according to the present invention.
Figure 2B:
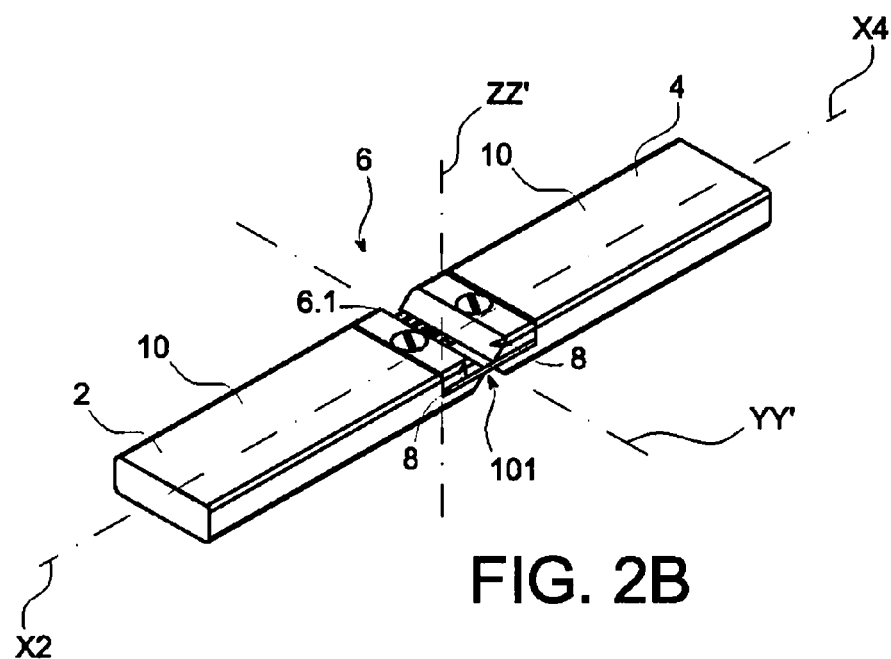
Figure 2C:
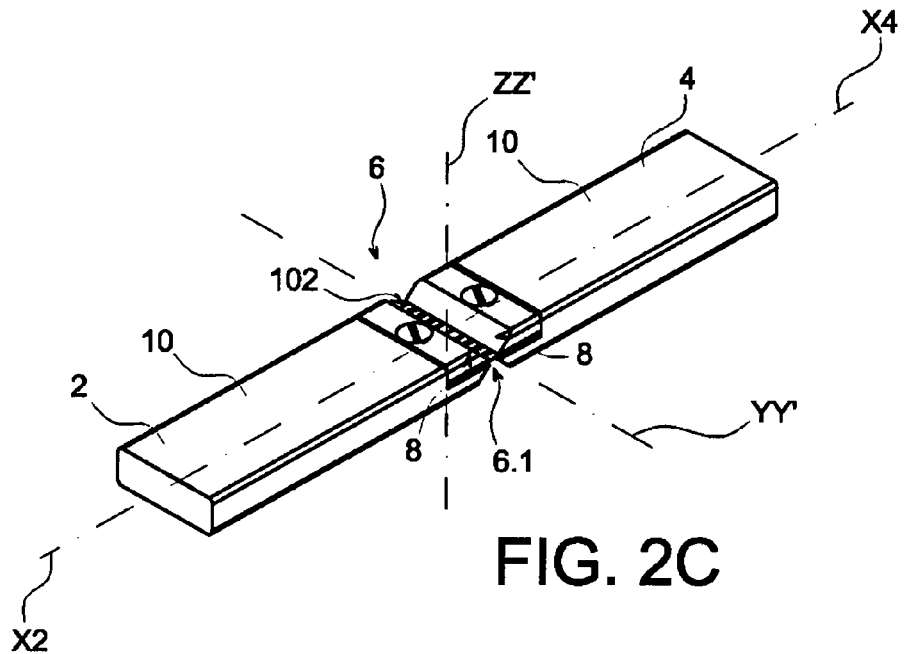
Figure 2D:
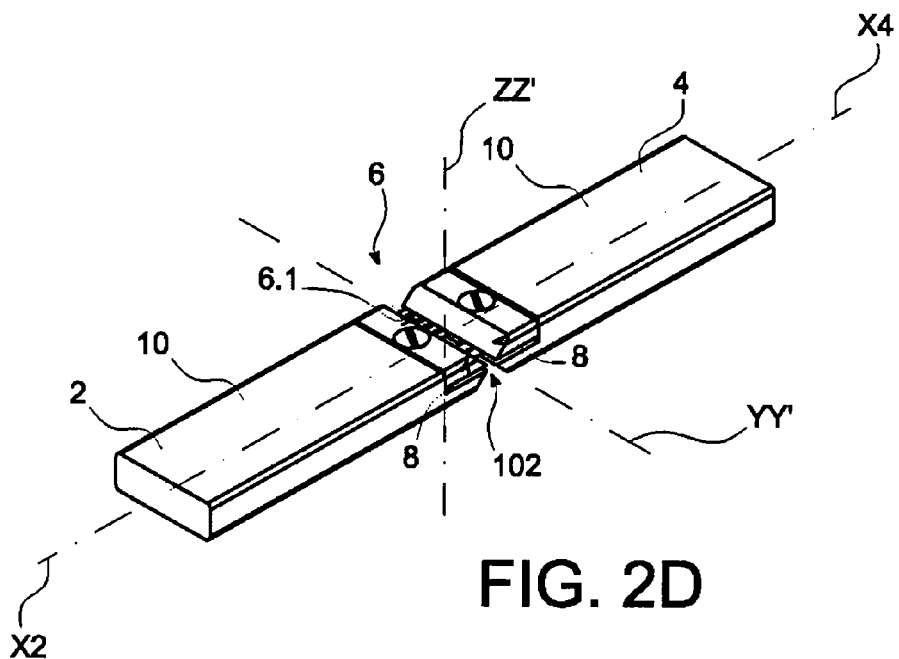

FIG. 1D presents a variation of embodiment of the device of FIG. 1c where the measurement element 102 is placed next to the cables 6.1 to facilitate assembly of the device.

One can also consider clamping the cables and the measurement elements between two elements forming each segment, as illustrated in FIGS. 2A to 2D.

In FIGS. 2A to 2D, each segment comprises, at the level of its end designed to be connected to the other segment, a small plate 8 which will be fixed on a main body 10 of the segment (for example using a screw), the ends of the cables 6.1 and the measurement element 101, 102 then being clamped between the main body 10 and the small plate 8 (here again, for clarity, the electrical and electronic or optical cabling as well as the electronic and computer circuits and elements for power and processing of the measurement elements 101, 102 are not illustrated in FIGS. 2a to 2d).

One can also consider, during molding, that the cable comprises, at its ends, loops forming eyelets, in order to ensure solid anchoring in the material. One can also provide for introducing metallic parts, for example pins, so as to penetrate this type of loop in order to realize anchoring in the material.

In the case of clamping of the ends of the cables, one can provide for working the surface state of the main body and of the small plate so as to increase friction, for example by shot blasting or by stamping. One can also provide locally for impressions adapted such that the parts 8 and 10 do not hurt or damage the measurement elements.

The distance between the two ends 2.1 and 4.1 of the segments designed to be connected is optimized, so as to allow rotational movement around the axis YY' while avoiding contact between the two ends 2.1 and 4.1 as much as possible. Thus, the length of the cable between the two segments is not null and is determined so as to avoid parasitic translational movements along the axis YY', along the axes X2 and X4 and along an axis ZZ', and also rotational movements around axes X2 and X4 and ZZ'. The axis ZZ' is orthogonal to the axes X2 and X4 and YY'.

Moreover, it can be provided, to avoid interference between the ends 2.1 and 4.1 of the segments, to realize a beveled profile of these ends 2.1 and 4.1. Thus, during significant folding of the joint, the ends 2.1 and 4.1 will not come into contact, or then only when the two segments 2, 4 form a significant angle. For example, in the case of a bevel at 45°, the segments 2 and 4 will only come into contact at the soonest when these are oriented at a 90° angle relative to each other.

The profile of the ends 2.1 and 4.1 seen from the side can be triangular or pointed. The angle of the point will be chosen so as to offer sufficient resistance to stresses, which requires sufficient material around the cables. Moreover, an overly pointed profile could also be cutting and therefore damage the cables and measurement elements.

The distance between the bodies 2 and 4 as well as the profile of the ends 2.1 and 4.1 will have an impact on the deformation of the cables and the measurement elements 101 and 102. The latter in particular may be calibrated according to these parameters so as to optimize the quality of the measurement of the joint angle (identification of measurement parameters, use of reference curves or calculation charts, . . . ).

In FIGS. 3A1 to 3A6 and 3B1 to 3B6, one can see a second embodiment of a jointed limb according to the present invention.

This embodiment differs from the first embodiment illustrated in FIGS. 1 and 2 in that the joint 6 is obtained from a layer of fibrous material fixed on each of the segments 2, 4 of the jointed limb. As for a cable, this fixing can be obtained by molding (FIGS. 3B1 to 3B6) or by tightening (FIGS. 3A1 to 3A6). The fibrous material which forms the joint 6 can be of the woven type, i.e. it is obtained by weaving of weft threads and warp threads; it therefore offers significant resistance along the axis of the weft thread and the axis of the warp thread.

The layer of fibrous material can also be formed by non-woven material. In this case, it is made from a veil or a layer of individual fibers oriented directionally or randomly, connected in particular by friction and/or cohesion and/or adhesion.

Advantageously, the orientation of the fibers makes it possible to determine a favored direction of resistance to traction.

The layer 6.2 of fibrous material will advantageously be able to be pierced at its ends designed to be maintained in the segments 2 and 4, metallic eyelets could be added in the piercings in order to further increase resistance and one could also provide, as for the cables, for the insertion of metallic elements in order to strengthen the resistance to traction.

In the case of molding, the layer of material can be openwork, which will allow the materials forming the segments to go through the layer of fibrous material, and therefore to improve the behaviour of the jointed limb.

The layer of fibrous material can be a cloth of aramid fiber, carbon fiber or glass fiber, it can also be a woven material soaked or coated, of the ribbon armed with polypropylene type, with polyester or textile material.

The measurement element can be a film 101 or one or several wires or fibers 102. It can be placed next to the layer 6.2 of fibrous material as in FIGS. 3A1 (3B1, resp.) and 3A4 (3B4, resp.). One can also place two layers of fibrous material 6.2 on both sides of the measurement element 101, 102 in order to increase the resistance of the joint to parasitic movements as in FIGS. 3A2 (3B2, resp.) and 3A5 (3B5, resp.). Lastly, one can note the measurement element 101, 102 at the heart of the fibers of the fibrous material as in FIGS. 3A3 (3B3, resp.) and 3A6 (3B6, resp.). In the case of a woven material, one could for example place the measurement element between two woven layers.

Figure 4A:
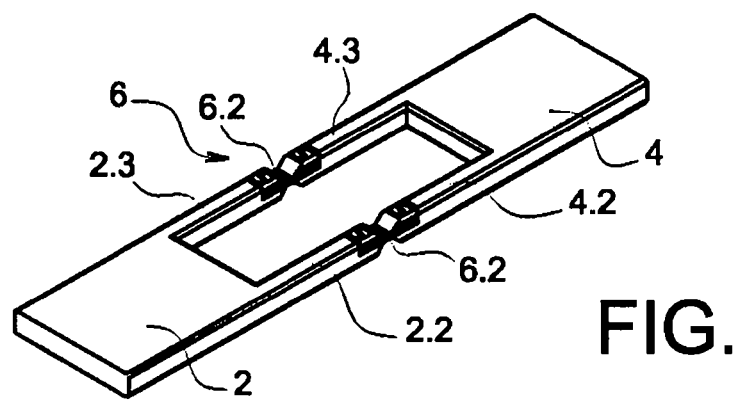
FIGS. 4A and 4B are perspective views of variations of embodiment of the limb of FIGS. 3A1 to 3A6 and 3B1 to 3B6, respectively.
Figure 4B:
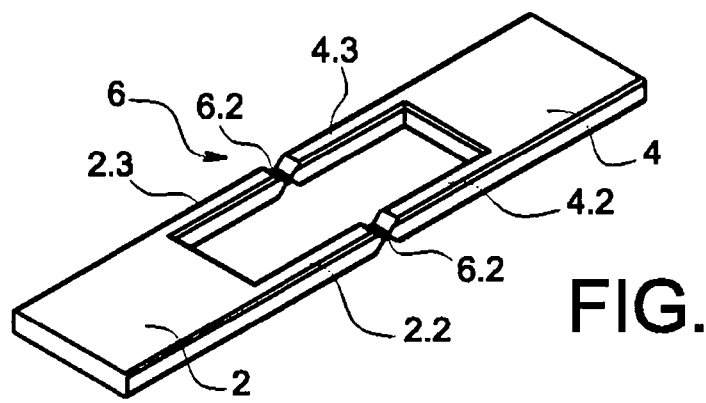

In FIGS. 4A and 4B, one can see a second embodiment of a jointed limb according to the present invention (for clarity of the figures, the measurement elements 101, 102 are not illustrated in FIGS. 4A and 4B, but they are part of the device here as well). In this case, the joint is of the double type. Each of the segments 2 and 4 is substantially U-shaped, the branches of the U 2.2, 2.3, 4.2, 4.3, respectively, being designed to be connected by their free end using a joint according to the present invention. In the illustrated variation, this is a joint 6.2 produced using a layer of fibrous materials, maintained by tightening (FIG. 4A) or by molding (FIG. 4B). One could also use one or several cables to connect each of the free ends of the U of the segment 2 to the free end of the U of the segment 4 across from it.

This type of double joint makes it possible to increase the solidity of the jointed limb.

Figure 5A:
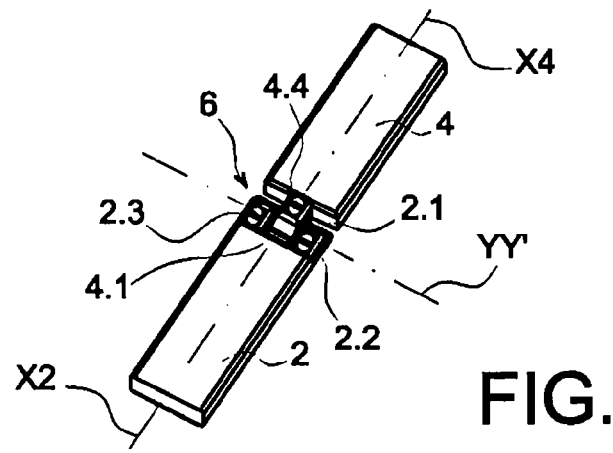
FIGS. 5A to 5D are perspective views of a second embodiment.
Figure 5B:
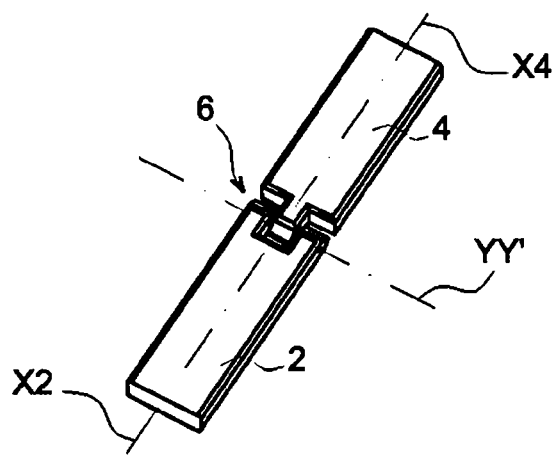

In FIGS. 5A and 5B, one can see another variation of embodiment of a jointed limb according to the present invention, in which this time the fibrous material and the measurement element are solicited in torsion and not in flexion.

In FIG. 5A, one can see the first segment 2 comprising an end 2.1 designed to be connected to the second segment 4; this end 2.1 is substantially U-shaped. The second segment 4 comprises, at its end 4.1, a protruding part 4.4 designed to be arranged between the two branches 2.2 and 2.3 of the U of the end 2.1 of the segment 2. The joint 6 according to the present invention is then fixed to the branch 2.2 at the protruding part 4.4 of the segment 4 and to the second branch 2.3 of the segment 2.

The joint according to the present invention therefore extends transversely relative to the axes X2 and X4 of the segments 2 and 4, and parallel to the axis of rotation YY'. This arrangement allows more significant travel. The travel is only limited by the capacities of the wire and the measurement element in torsion and by the shape of the adjacent segments. In FIGS. 3A and 3B, the travel is in the vicinity of 90°; it could be more significant with more pointed segments; it reaches more than 180° in FIGS. 5A and 5B and more than 300° in FIGS. 6A and 6B, as we will see below.

The mode of fixing the joint according to the present invention to the segments 2 and 4 can be as previously obtained by tightening (FIG. 5A) or by molding (FIG. 5B).

The ends of the segments 2 and 4 across from each other are configured so as to avoid interference, or at least to reduce the risk of interferences, in particular by making beveled shapes.

Advantageously, this variation of embodiment is realized with a joint in cable form; one or several cables can be used.

Figure 5C:
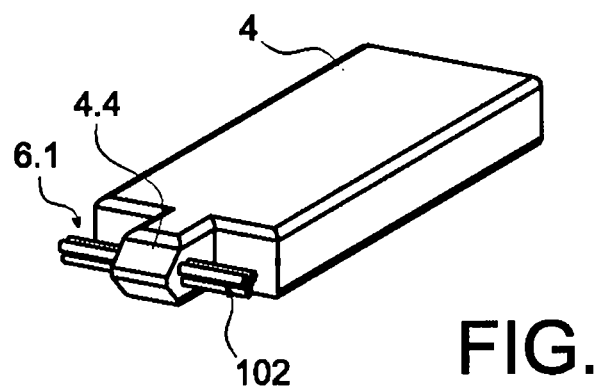

In FIG. 5c, one can see the segment 4 alone before its assembly with the segment 2. One can see the cable joint 6.1 and one or several elements are present in the form of wires 102 fixed in the protruding part 4.4. In this case, the cables 6.1 and the measurement elements 102 comprising several cables are arranged in the mold during molding of the segment 4 (as previously, out of a concern for readability in FIGS. 5C and 5D, we have not illustrated the electrical cabling circuits and the electronic cards for processing of the measurement elements).

One could choose here, as measurement elements 102, a wire in conductor polymer or a wire of flexible material (polymer, nylon, . . . ) charged with metallic particles and collinear to the axis of articulation and the physical characteristics (resistance) of which vary according to its torsion (FIG. 5C). One may also place one or several wires near and parallel to the joint. In this case the angulation of the joint will cause the length of the wires to vary whereof one can detect, for example, a variation of image resistance of the angle.

Figure 5D:
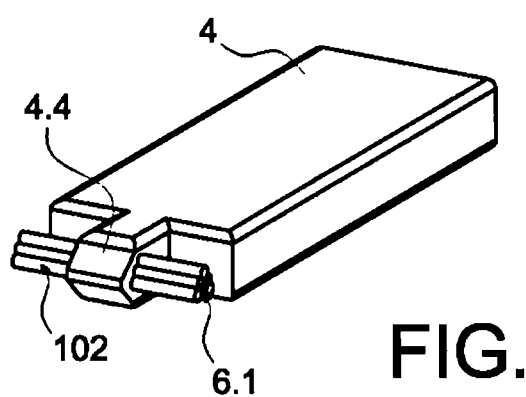

In order to produce a limb like that of FIG. 5B, one for example realizes the segment 4 as illustrated in FIG. 5C or FIG. 5D beforehand, then one arranges free ends of the cables 6.1 and measurement elements 102 inside the mold of the segment 2 at the branches 2.2, 2.3.

Figure 6A:
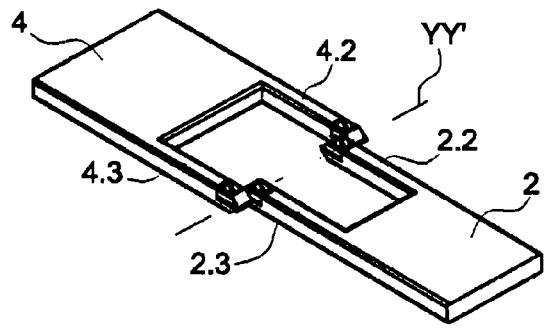
FIGS. 6A and 6B are perspective views of a variation of the second embodiment.
Figure 6B:
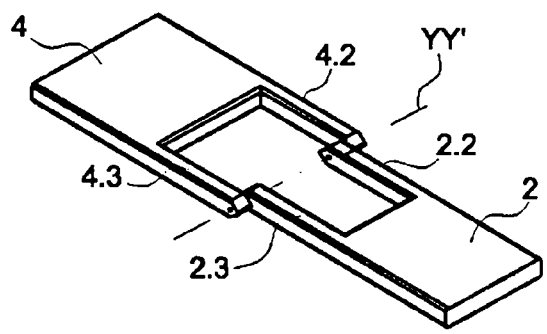

In FIGS. 6A and 6B one can see a variation of embodiment of a jointed limb according to the present invention; this limb comes closer to that illustrated in FIGS. 4A and 4B. In this variation, the cable(s) is/are arranged parallel to the axis of rotation similarly to the embodiment illustrated in FIGS. 5A and 5B (for clarity of the figures, the measurement elements 101, 102 are not illustrated in FIGS. 6A and 6B, but they are also part of the device).

The joint then comprises two fibrous elements each transversely connecting the ends of the branches 2.2, 2.3 of the segment 2 to the branches 4.2, 4.3 of the segment 4, respectively. In the illustrated example, the segment 2 has a width smaller than that of the segment 4, in particular the outer width at the branches 2.2, 2.3 of the segment 4 is smaller than the interior width between the branches 4.2, 4.3 of the U of the segment 4 in order to allow the introduction of the U of the segment 2 into the U of the segment 4.

Figure 7:
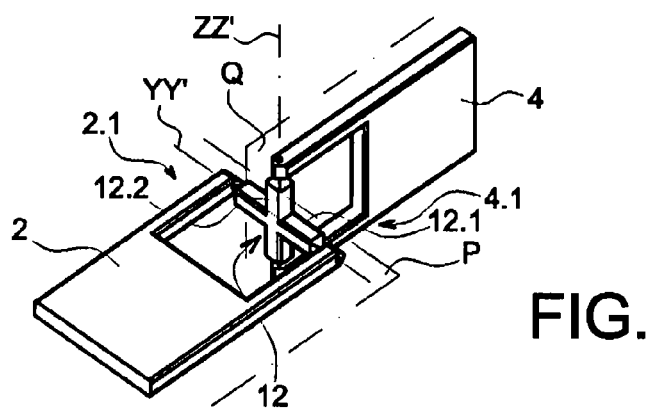
FIG. 7 is a perspective view of a universal joint according to the present invention.

The joints presented until now offer a degree of freedom around the axis YY'. In FIG. 7, is illustrated a joint offering several degrees of freedom.

In FIG. 7 one can see a universal joint made with joints according to the present invention (for clarity, here again the measurement elements 101, 102 are not illustrated in FIG. 7, but they are an integral part of the device).

The universal joint according to the present invention comprises a segment 2 arranged along a first plane P and comprising a U-shaped end 2.1, a second segment 4 arranged along a second plane Q and comprising a U-shaped end 4.1.

The planes P and Q being oriented orthogonally relative to each other, the branches of the U of the second segment are arranged substantially symmetrically on both sides of the plane P.

The universal joint according to the present invention also comprises a journal cross 12 provided with a first branch 12.1 and a second branch 12.2 orthogonal relative to each other. The ends of the branch 12.1 are connected by joints according to the present invention to the branches of the U of the first segment 2 and the ends of the second branch 12.2 are connected by joints according to the present invention to the branches of the U of the second segment 4. The joints can be realized using a single cable and measurement element which are fixed for example by molding to the journal cross and to the segments 2, 4, or using several strands of cables connecting each end of the journal cross to the segments 2 and 4.

Thus, the segment 2 can move in rotation around the axis YY' and the segment 4 can move in rotation around the axis ZZ'.

It is clearly understood that the jointed limbs illustrated in FIG. 7 can include several cables, for example braided.

Moreover, it can be provided to replace the cables by a plate of woven or nonwoven fibrous material wound so as to form a joint with an elongated shape.

The jointed limb according to the present invention can be actuated using a device mounted on one of the segments and causing the other segment to rotate.

Figure 9:
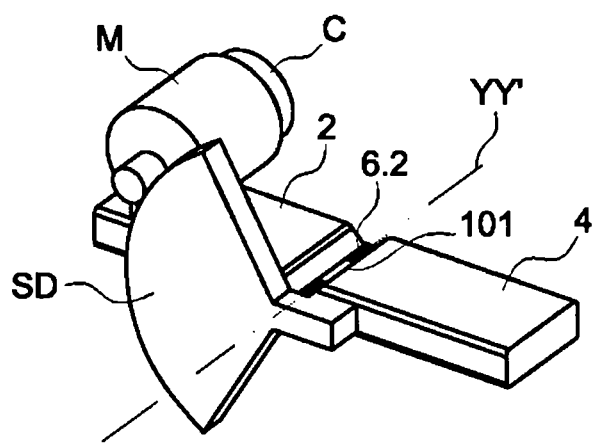
Figure 10:
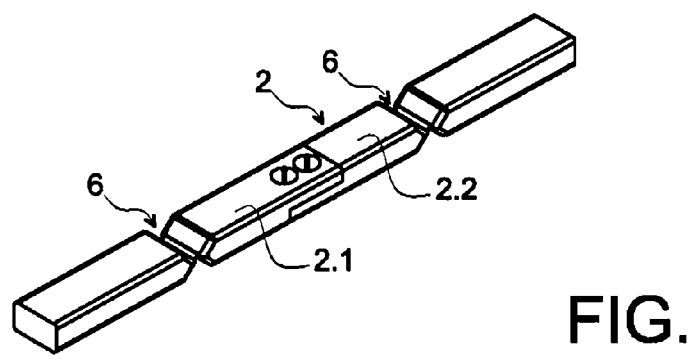
FIG. 10 is a perspective view of one example of a double-jointed limb according to the present invention.

In FIGS. 9 and 10, one can see one such example of an actuation device for a jointed limb according to the present invention (in these figures, the flexible element is a layer of fibrous material and the measurement element is present in the form of a conductive polymer film or a flexible film provided with metallic particles or electrodes and whereof the capacity or the resistance varies according to the angle formed by the joint, but any other device previously described could be used).

In the illustrated example, the segment 2 supports a motor M provided with a coder C, at the outlet from its axis of rotation a toothed wheel meshing with a toothed sector SD integral in rotation with the second segment 4. Thus, the rotation of the motor causes the movement around the axis YY' of the second segment 4.

In the illustrated example, the toothed sector SD is fixed on the side of the segment 4, thus it does not hinder the joint of the segment 4 relative to the segment 2, i.e. it does not reduce the travel between the two rigid segments 2, 4.

One could also provide, for actuating the jointed arm according to the present invention, a cable capstan. For this, a primary pulley is fixed at the outlet from the motor M and a secondary pulley is fixed on the other segment in place of the toothed sector SD. A cable is fixed on the secondary pulley and wound on the primary pulley so as not to slide thereon. The rotation of the motor then drives the primary pulley, which drives the secondary pulley via the cable, and therefore the rotation of the segment 4 relative to the segment 2.

It is clearly understood that any other type of actuator can be considered to drive the jointed limb according to the present invention, for example a linear actuator, the ends of which would each be fixed on a segment or a device connecting a motor and a wheel and worm system. This solution is of course quite suitable for a robot while using a stress sensor to make the system transparent on a haptic interface.

The motor itself can be of any type, in particular a direct-current motor, a brushless motor, a piezoelectric actuator or a shape-memory alloy-based actuator. One can also use a gear motor. On a haptic interface, one can also use a braking device to oppose the movements of the user, in particular a magnetic brake, a powder brake or a device using magnetorheological or electrorheological fluids.

In the same way, the coder can be replaced by any other type of position sensor, in particular an optical coder, a hall effect sensor or a magneto-optical sensor. Moreover, the sensor can be placed on the motor, directly on the joint or be off board. It can also be doubled, for example by placing a sensor on the motor and another sensor on the joint. This redundancy grants the device greater reliability.

Lastly, the measurement elements 101, 102 can be replaced by any type of sensor integrated into the joint and making it possible to measure its rotation. One could thus also use a diode placed on the segment 2 and a photodiode placed on the segment 4 and connected by an optical fiber, the optical losses of which increase with the curve radius. Thus, the light received by the photodiode would depend on the distance between it and the diode, therefore the angle between the segments 2 and 4. In the same way, one could use two coils deposited on a flexible film 101 and operating like antennae whereof the inductive coupling depends on the angle between the segments. One can also use stress gauges 160 arranged on a flexible membrane the deformation of which causes stresses in the gauges according to the angle of the joint.

In all cases, the use of an absolute measurement element 101, 102 placed in the joint in addition to a coder on the motor providing relative information (over one motor revolution) enables measurement redundancy favorable to the reliability of the system and makes it possible to free oneself from an initialization phase of the system at start-up, which is very advantageous.

In the continuation of the description, we will describe structures formed by the connection of jointed limbs according to the present invention.

Figure 11:
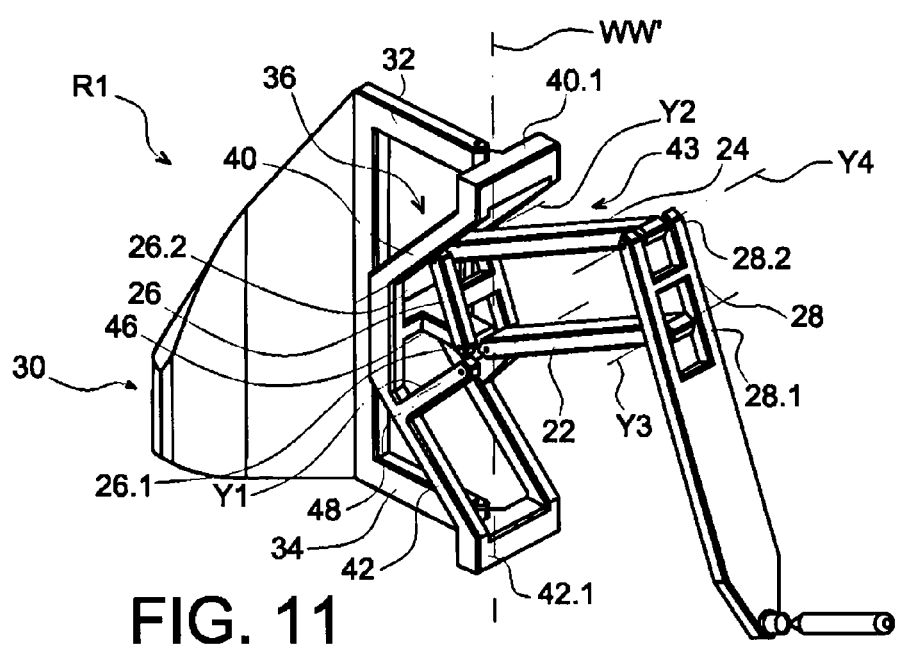
FIG. 11 is a perspective view of an example of structure implementing jointed limbs according to the present invention.

In FIG. 11, one can see a first example of a robot R1 implementing the jointed limbs according to the present invention.

Figure 12:
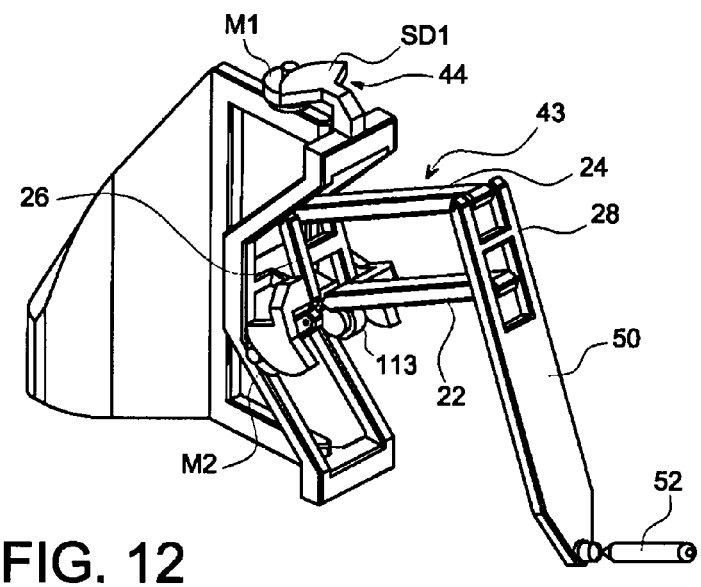
FIG. 12 is a structure identical to that of FIG. 11 to which actuators were added.

The robot R1 comprises a base 30 provided with two fixed arms 32, 34 parallel to the ends of which is mounted, mobile, a support 36 in rotation around an axis WW', substantially vertical in FIG. 12.

The mobile support 36 is connected to the fixed arms 32, 34 by a double joint identical to that illustrated in FIGS. 4A and 4B.

One will note that a simple joint of the type of that presented in FIGS. 3A1 to 3A6 and 3B1 to 3B6 could be suitable, its doubling making it possible, however, to increase its resistance to parasitic movements (other than rotation around the axis WW').

The mobile support 36 is substantially V-shaped with a flat bottom connected to the base at the ends 40.1, 42.1 of the branches 40, 42 of the V.

Figure 8:
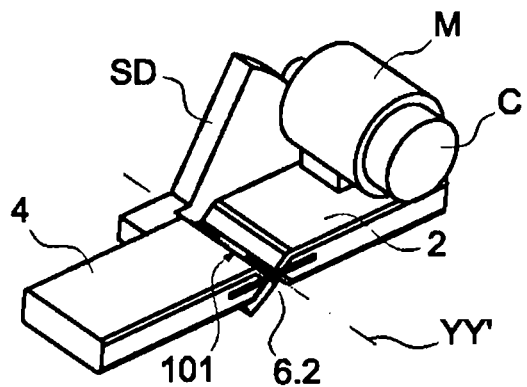
FIGS. 8 and 9 are perspective views of an example of actuator of a jointed limb according to the present invention.

The mobile support is actuated in rotation around the axis WW' using an actuator 44 of the type previously described in relation with FIGS. 8 and 9. In the illustrated example, the motor M1 is mounted on the base 30, its axis being parallel to the axis WW' and its toothed wheel meshing with a toothed angular sector SD1 fixed on the end 40.1 of the mobile support 36.

The rotation of the toothed wheel causes a movement of the angular sector SD1 which drives the mobile support 36 in rotation around the axis WW'.

Any other driving solution would be suitable, in particular a band, a cable (mounted in capstan) or a friction drive roller.

The robot R1 also comprises a jointed parallelogram 43 between the branches 40, 42 of the V of the mobile support 36.

The parallelogram comprises an arm 22, a connecting rod 24 arranged parallel to the arm 22, and connected by their ends by two parallel small connecting rods 26, 28.

In the illustrated example, the arm 22 and the connecting rod 24 have a full rectangle shape, and the small connecting rods have, seen from the front, a capital H shape. This H shape is illustrative and any other shape allowing sufficient travel would be suitable.

The small connecting rod 26 is jointed by its first end 26.1 on the ends of two arms 48 integral with the branch 42 of the mobile support 36, extending substantially perpendicular to the branch 42. The joint between the small connecting rod 26 and the arms 48 is identical to that of FIGS. 4A and 4B.

The small connecting rod 26 is jointed by its second end 26.2 on the connecting rod 24 by a joint similar to that of FIGS. 5A and 5B. The small connecting rod 26 is then jointed in rotation around an axis Y1 relative to the support 36.

The small connecting rod 26 is therefore jointed on the arm 22 and on the connecting rod 24 by a first end 26.1 and by a second end 26.2, respectively. The small connecting rod 26 is therefore able to pivot around an axis Y1 orthogonal to the longitudinal axis of the arm 22 at its first end 26.1, and around an axis Y2 orthogonal to the longitudinal axis of the connecting rod 24 at its second end 26.2.

The arm 22 is mounted jointed, around an axis combined with the axis Y1, on the mobile support 36 on an arm 46 protruding from the base of the V between the branches 40, 42 by a joint of the type illustrated in FIGS. 3A1 to 3A6 and 3B1 to 3B6.

The small connecting rod 28 is jointed on the arm 22 and on the connecting rod 24 at its two longitudinal ends 28.1, 28.2 using a joint of the type illustrated in FIGS. 5A and 5B.

The small connecting rod 28 is therefore jointed on the arm 22 and on the connecting rod 24 by a first end 28.1 and by a second end 28.2, respectively. The small connecting rod 28 is therefore able to pivot around an axis Y3 orthogonal to the longitudinal axis of the arm 22 at its first end 28.1, and around an axis Y4 orthogonal to the longitudinal axis of the connecting rod 24 at its second end 28.2.

Thanks to this structure, the rotation of the small connecting rod 26 or of the small connecting rod 28, causes a movement of the connecting rod 24 parallel to the arm 22.

It is then possible to realize high precision movement of objects connected to the small connecting rod or to the arm.

The small connecting rod 26 is moved using a motor M2 (FIG. 12) mounted on the mobile support 36 and a pulley P1 fixed on the sides of the small connecting rod 26.

The arm 22 is actuated using a motor M3 (FIG. 12) mounted on the mobile support 36 and a pulley P2 fixed on the sides of the arm 22.

The actuators can connect motors and gears or capstan reducers or any other transmission means. The motors can also be placed on the base 30 by using appropriate transmission means.

The small connecting rod 28 extends downward in the illustrated example to form a forearm 50. An element 52 is mounted hinged on a free end 50.1 of the forearm with a ball connection, realized by a cable submerged in the adjacent bodies.

The connection between the element 52 and the forearm 50 can be of any type, and not necessarily the ball type.

One can also consider actuating the element 52. However, in this case, it would be more advantageous to realize the ball connection using three competing pivot connections, which would offer greater ease of motorization.

The different types of joint implemented are given as examples and any other combination using the joints according to the present invention can be considered.

Likewise, the shapes of the segments (H-shaped, V-shaped, . . . ) are provided as examples. Any other type of segment shape could be used. The body 36 in particular here is V-shaped such that the axes WW' and Y1 are concurrent. It could be straight, in which case these axes would not necessarily be concurrent.

The element 52 can be a handle in the case of haptic systems, in particular for remote operation in remote control of robots, or an object to be moved.

This structure thus forms a robot with six degrees of freedom. In the example illustrated in FIGS. 11 and 12, only rotations around axes WW', Y1 and Y2 are actuated using actuators, but as described above one can also provide for the movement of the element 52 by an actuator.

We will now describe the operation of such a robot in relation to FIGS. 11 and 12.

The control of the motor M1 causes the movement of the mobile support 36 around the axis WW', the control of the motor M2 causes rotation of the small connecting rod 28 around the axis Y1 relative to the mobile support 36, and the actuation of the motor M3 causes rotation of the arm 22 around the axis Y1. The parallelogram 43 is then deformed.

The forearm 50, and therefore the element 52 are then able to pivot around the axis Y3, to be lowered, raised, moved forward and moved backward thanks to the transmission of the movement via the parallelogram.

In one embodiment of a haptic interface, the system then comprises a robot R1 forming an interface, the element 52 being a handle manipulated by an operator, the actuators generating a counter-reaction signifying the operations of a virtual object in its environment or of a robot with a structure identical or not to that of the robot R1, in which the element 52 is an object to be moved.

The generic term "robot" will be used for simplification to designate both a robot and a haptic interface.

One can consider realizing all of the structures of FIGS. 11 and 12 in a single piece by obtaining all the joints during molding. However, one can produce a structure able to be disassembled, in this case all or part of the joints can be obtained by assembly according to FIGS. 2A to 2D.

Advantageously, in order to achieve simpler assembly, the joints will be obtained by molding, which makes it possible to take advantage of their simplicity of realization and to perform a mechanical assembly, in particular by screw at the robot segments, as illustrated in FIG. 10 in which the segment 2 comprises joints 6 according to the present invention at its two ends obtained by molding and the segment in itself is realized in two parts 2.1, 2.2 made integral by screwing or any other connecting means.

Figure 13:
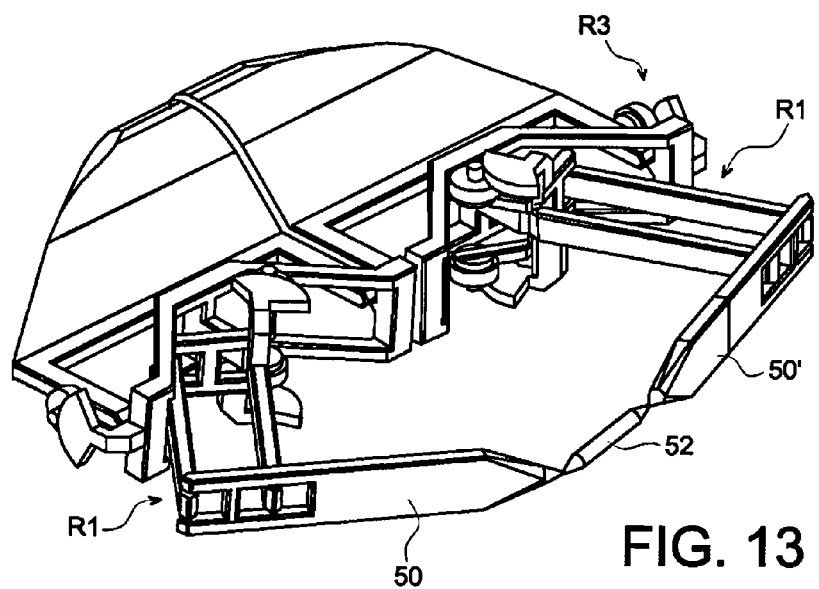
FIG. 13 is a perspective view of a first example of robot implementing two structures from FIG. 12.

In FIG. 13, one can see another embodiment of a robot R3 according to the present invention offering five degrees of freedom in stress, i.e. five degrees of freedom over which a stress can be generated by the motors of the robot.

The robot R3 comprises two robots R1 head to tail, each of the ends of the forearms 50, 50' being jointed on each of the ends of a shared element 52 using a ball connection realized by a cable submerged in the adjacent bodies.

The element 52 can be a handle of a haptic system or an element to be moved.

Figure 14:
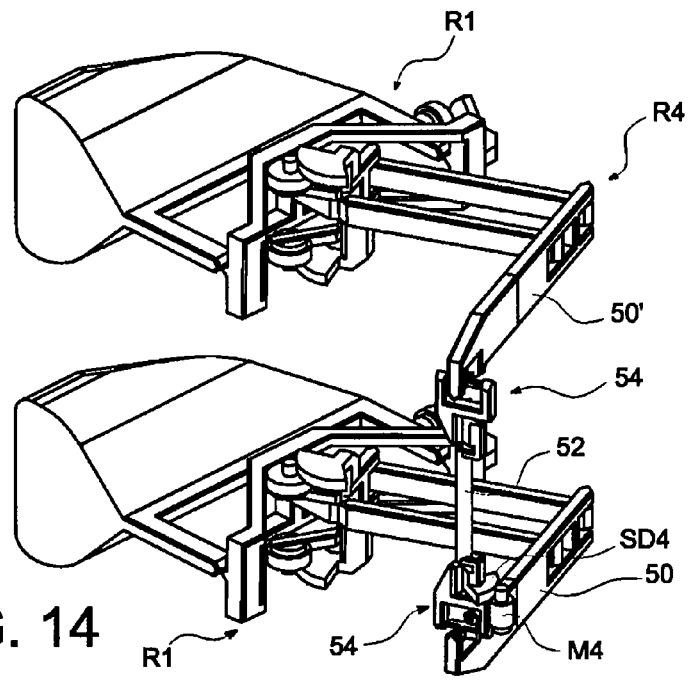
FIG. 14 is a perspective view of a second example of robot implementing two structures from FIG. 12.

In FIG. 14, the robot R4 comprises two robots R1 arranged in parallel, a robot R1' being arranged above a robot R1.

The element 52 is, in the illustrated example, jointed on each of the forearms 50, 50' by a joint of the universal type 54 as illustrated in FIG. 7 connected in series with a rotation joint such as that present in FIGS. 3A1 to 3A6 and 3B1 to 3B6.

Moreover, an actuator 58 of the element 52 is provided, the motor M4 being supported by the end part of the universal joint 54 and the angular sector SD4 being integral with the element 52.

The robot R4 according to FIG. 14 offers six degrees of freedom in stress, which is particularly advantageous when the element 52 is a handle. Indeed, in the case of the robot R3, the handle is connected to the forearm of each substructure by a composite ball joint and the handle cannot be actuated with the six motors of the robot, the head to tail structure having only 5 degrees of freedom in stress.

One can also consider connecting the element 52 to the forearm 50 using at least one substructure with three concurrent pivot connections.

In the examples of the robots R3 and R4, the element 52 is connected to the two substructures by the same type of connections (ball or universal pivot assembly). It is of course possible to use one type of connection between the robot R1 and the element 52 and another type of connection between the robot R1' and the element 52.

Figure 15:
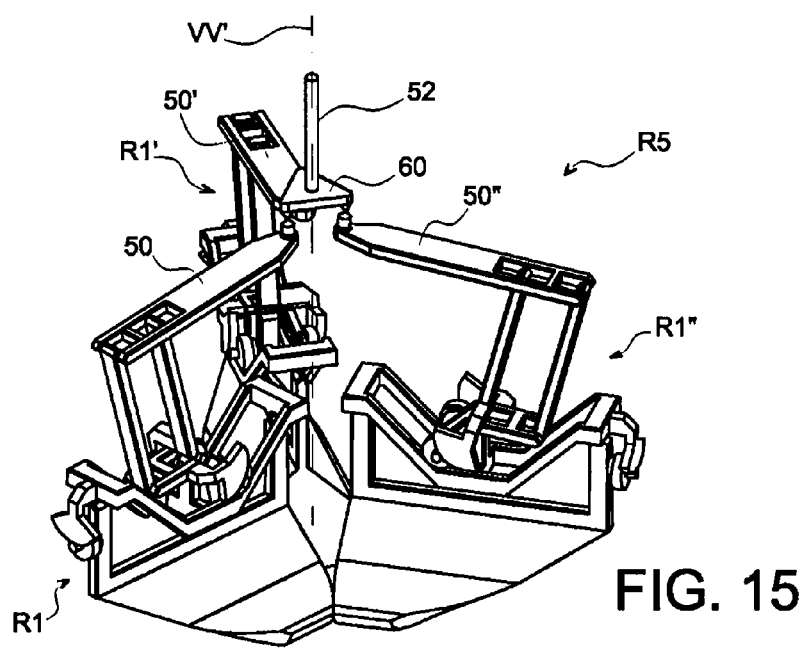
FIG. 15 is a perspective view of another example of robot implementing three structures from FIG. 12.

In FIG. 15, one can see another example of embodiment of a robot R5 offering six degrees of freedom.

Figure 16:
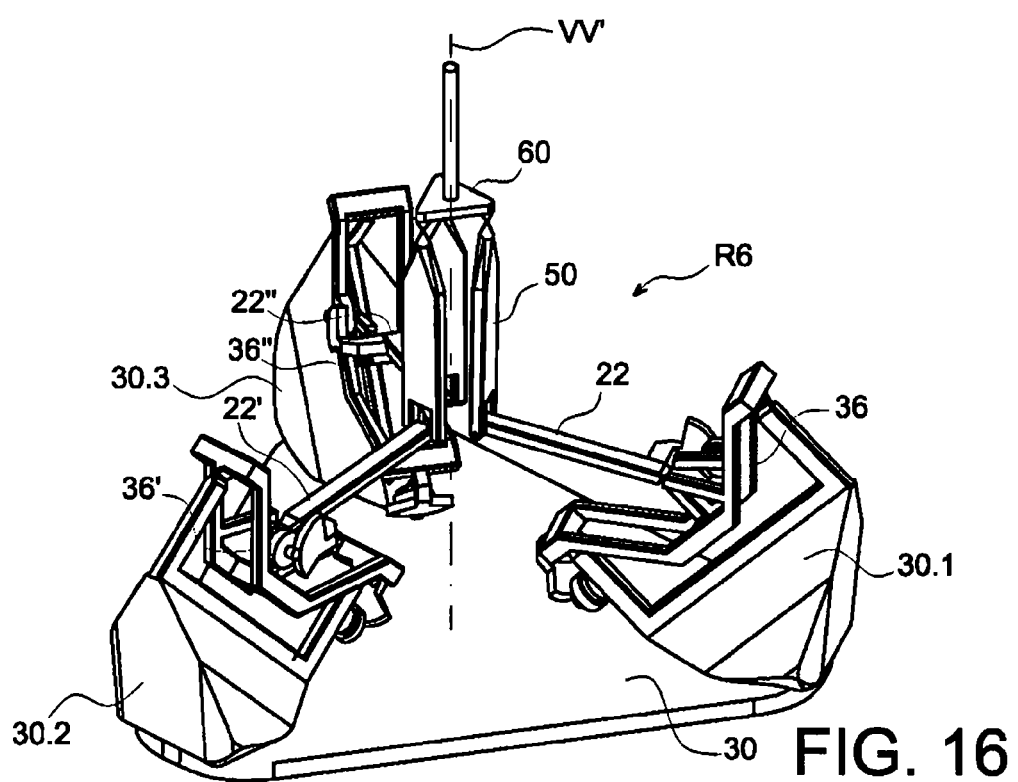
FIG. 16 is a perspective view of another example of embodiment of a robot implementing jointed limbs according to the present invention.

As one can see in FIG. 16, the robot R5 comprises three robots R1, R1', R1", arranged regularly around the axis VV', a platform 60 supporting the element 52 mounted by ball connections done by a cable submerged in the adjacent bodies on the ends of the forearms 50, 50', 50".

In FIG. 15, the three axes of each robot R1, R1', R1" are actuated. This redundancy makes it possible to distance the singularities from the center of the workspace as is well-known by those skilled in the art.

One can also provide actuating only two axes of each robot. In general, it is the joints of the parallelogram which are actuated.

In FIG. 16, one can see a robot R6 close to the robot R5, in which the parallelogram structure has been removed, which simplifies the realization of such a robot.

The robot R6 comprises a shared base 30 comprising three sub-structures 30.1, 30.2 and 30.3 arranged regularly around the axis VV'. Three supports 36, 36', 36" are mobile in relation to the structures 30.1, 30.2 and 30.3 respectively thanks to joints of the type illustrated by FIGS. 4A and 4B. These joints are actuated by actuators. Each mobile support 36, 36', 36" supports an arm 22, 22', 22" mobile in rotation on the mobile support 36, 36', 36" by a joint actuated by an actuator of the type of FIGS. 3A1 to 3A6 and 3B1 to 3B6, and a forearm 50 mobile in rotation on the arm 22, by a joint of the type illustrated in FIGS. 5A to 5C.

The forearms 50, 50', 50" are connected to a platform 60 supporting the element 52 by ball connections realized by a cable submerged in the adjacent bodies.

The arms 22, 22', 22" are actuated respectively by an actuator as previously described.

These embodiments are provided only as examples and it is possible to use composite connections on many other systems such as, for example, portable interfaces for the fingers, the hand or the wrist, of the exoskeleton type, such as those described in document FR 2 863 535.

Figure 17:
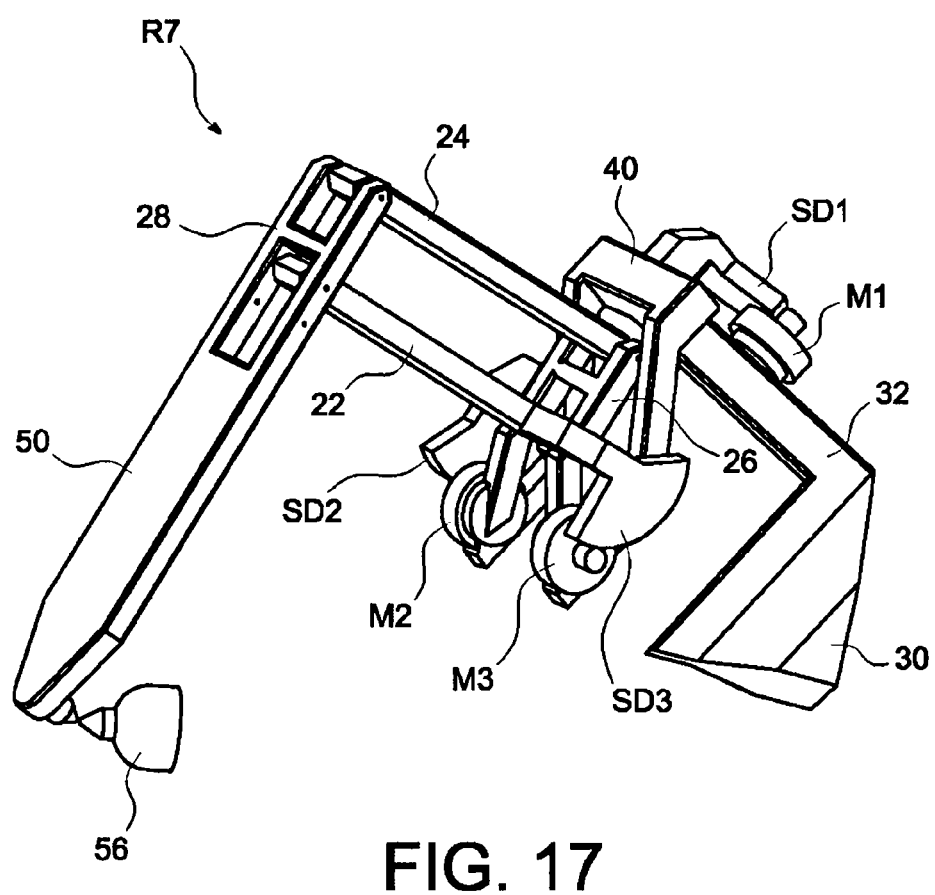
FIG. 17 is a perspective view of a variation of the structure of FIG. 12.
Figure 18:
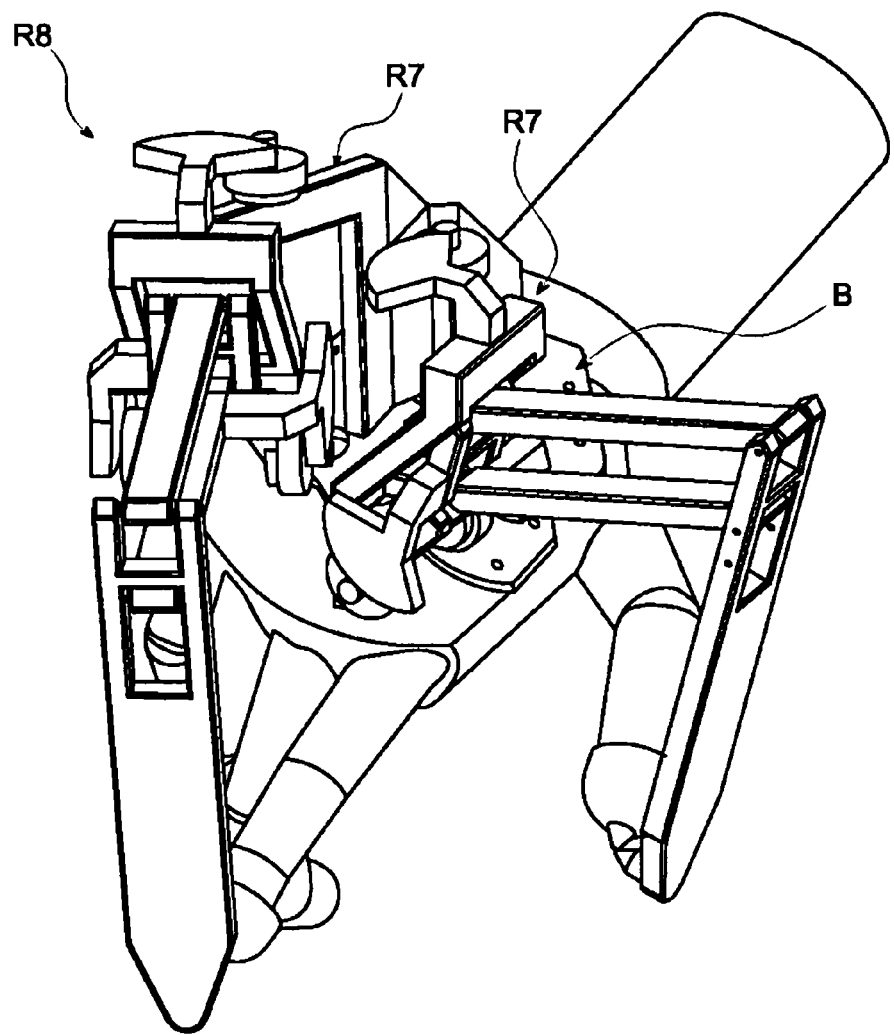
FIG. 18 is a perspective view of an example of portable interface implementing jointed limbs according to the present invention.

FIG. 18 illustrates such a device. This portable interface R8 is made up of two robots R7 of the type illustrated in FIG. 17 fixed on a shared base B itself designed to be fixed on the hand via straps, bands, or any other suitable fixing device such as those commonly encountered on medical splints. Such devices are known by those skilled in the art and will not be described in detail here. For readability, they are not illustrated in FIG. 18. This interface can be mounted on a carrying robot not illustrated. It can also be used autonomously. One will then generally use a 6D movement capture system to measure one's movements in space and control the force feedback as a result. Such a device in general requires that the handle be equipped with retro-reflective balls whereof the position is measured in space by at least 2 cameras. This type of device is also known by those skilled in the art and will not be explained in detail or illustrated here. The robot R8 allows a force feedback at the end of the thumb and index finger. It would of course be possible to ensure a force feedback on the end of the other fingers by adding other robots of the R7 type on the base B without going outside the scope of the invention.

FIG. 17 illustrates a robot like those used in FIG. 18. This robot R7 is similar to the robot R2 illustrated in FIG. 12. It differs from the latter essentially in that the capture member here is a thimble 56 in which one inserts the finger. The thimble 56 is illustrated fixed but it could be adjustable as presented in document FR 2 863 535. Likewise, the thimble is connected here to the segment 50 by a cable serving as ball. One could also use 3 concurrent pivot connections. The pivot connection concurrence point would then ideally be located at the center of the distal phalanx of the finger. The robot R7 also differs from the robot R2 in that the base 30 is provided with a single fixed arm 32. The mobile support is also provided with only one branch 40. The other characteristics of the robot R7 are the same as those of the robot R2.

The composite joints according to the present invention are applicable primarily in the field of robotics and for sensorial interfaces.

We have indeed realized a jointed and instrumented limb whereof the joint has a low resistance to movement due to the use of fibrous materials offering great resistance with a reduced thickness and measurement elements with a small thickness. The travel of the segments of the joint is also increased, as is its solidity.

Moreover, engaging the fibrous material inside the rigid segments and not outside them makes it possible to improve the transparency to movement, i.e. the reduction of a resistant effort. Furthermore, this makes it possible to increase the travel since the ends of the segments are refined relative to two segments provided with a joint mounted around the ends of the segments.

Moreover, the realization of such joints is very simplified, in particular in the case of production by molding, moreover the cost can be greatly reduced due to the simplicity of realization and the choice of materials.

Another advantage of this type of structure is to allow considerable reduction of the assembly, adjustment and maintenance time, compared to the joints requiring precise assembly of parts.

Lastly, this type of connection offers many advantages due to the integration of a measurement element in the joints, whether they are active or passive: they allow absolute measurement of the movements making it possible to avoid initialization phases, measurement of the passive joints making it possible to simplify the models of parallel robots, and a measurement redundant with that of the sensors connected to the motors enabling greater reliability.

This type of connection can be used to realize simple connections, having a single degree of freedom or multiple, having several degrees of freedom. These connections can also be passive or active (motorized). Lastly, they can be used to produce complete robots, portable structures of the exoskeleton type.

The invention claimed is:

1. A jointed limb for a robot or haptic interface comprising:
   at least first and second rigid segments connected by a flexible mechanical joint, said flexible joint being formed by fibers and including at least one measurement element separate from said fibers,
   wherein said fibers which comprise said flexible joint receive, and are constructed to withstand, mechanical stress transmitted from one of said rigid segments to another of said rigid segments, such that said flexible joint bears said mechanical stress transmitted between said rigid segments,
   wherein end portions of said fibers comprising said flexible joint are fixed in each of the rigid segments,
   wherein said fibers comprising said flexible joint are corded to form at least two cables disposed parallel to each other,
   wherein a length of each said cable in a direction orthogonal to an axis of rotation of the flexible joint is larger than a width of said at least two cables,
   wherein the cables are constructed to bend, and
   wherein said cables are disposed on sides of the measuring elements.

2. The jointed limb according to claim 1, in which the measurement element comprises a film having an electric characteristic which varies according to its deformation.

3. The jointed limb according to claim 2, in which the measurement element is a flexible film equipped with stress gauges wherein a solicitation varies according to its deformation.

4. The jointed limb according to claim 1, in which the measurement element is one of a flexible film having electrodes on its upper and lower faces and a capacity which varies according to its deformation, and a flexible film having electrodes on its upper and lower faces and a resistance which varies according to its deformation.

5. The jointed limb according to claim 1, in which the measurement element comprises one or more wires, cables, or fibers and having an electric characteristic comprising one of a capacity and a resistance which varies according to its deformation and an angle between the segments connected by the joint.

6. The jointed limb according to claim 1, in which the fibers are comprised of an aramid fiber, Kevlar or polypropylene.

7. The jointed limb according to claim 1, further comprising actuation means for one of the segments relative to the other.

8. A jointed structure comprising:
   a base provided with one or two arms;
   a mobile support mounted via a joint on the base, the mobile support forming a jointed limb with the base; and
   a jointed parallelogram comprising an arm, a connecting rod parallel to the arm and first and second parallel small connecting rods, the arm connected via a joint on the mobile support, the arm and the mobile support forming one said jointed limb, the first small connecting rod connected via a joint on the mobile support or the arm and the first connecting rod, the support or the arm and the first small connecting rod, the connecting rod and the first small connecting rod respectively forming jointed limbs, and the second small connecting rod connected via a joint on the connecting rod and on the arm,
   wherein the second small connecting rod and the arm form one said jointed limb and the second small connecting rod and the connecting rod form another said jointed limb, the second small connecting rod forming an operation forearm,
   wherein the jointed limb comprises at least first and second rigid segments connected by a flexible mechanical joint, said flexible joint being formed by fibers and including at least one measurement element separate from the fibers,
   wherein said fibers which comprise said flexible joint receive, and are constructed to withstand, mechanical stress transmitted from one of said rigid segments to another of said rigid segments, such that said flexible joint bears said mechanical stress transmitted between said rigid segments,
   wherein end portions of said fibers comprising said flexible joint are fixed in each of the rigid segments,
   wherein said fibers comprising said flexible joint are corded to form at least two cables disposed parallel to each other,
   wherein a length of each said cable in a direction orthogonal to an axis of rotation of the flexible joint is larger than a width of said at least two cables,
   wherein the cables are constructed to bend, and
   wherein said cables are disposed on sides of the measuring element.

9. A robot or haptic interface comprising:
   at least one jointed limb which includes at least first and second rigid segments connected by a flexible mechanical joint, said flexible joint being formed by fibers and including at least one measurement element separate from said fibers, wherein said fibers which comprise said flexible joint receive, and are constructed to withstand, mechanical stress transmitted from one of said rigid segments to another of said rigid segments, such that said flexible joint bears said mechanical stress transmitted between said rigid segments, wherein end portions of said fibers comprising said flexible joint are fixed in each of the first and second rigid segments, wherein said fibers comprising said flexible joint are corded to form at least two cables disposed parallel to each other, wherein a length of each said cable in a direction orthogonal to an axis of rotation of the flexible joint is larger than a width of said at least two cables, wherein the cables are constructed to bend, and wherein said cables are disposed on sides of the measuring element.

10. A robot or haptic interface comprising:

two structures arranged head to tail, such that free ends of two operation forearms face each other, said forearms each being connected via a joint to an operation element using a ball connection that includes a cable submerged in adjacent bodies, wherein each said structure comprises
 a base provided with one or two arms;
 a mobile support mounted via a joint on the base, the mobile support forming a jointed limb with the base; and
 a jointed parallelogram comprising an arm, a connecting rod parallel to the arm and first and second parallel small connecting rods, the arm connected via a joint on the mobile support, the arm and the mobile support forming a one said jointed limb, the first small connecting rod connected via a joint on the mobile support or the arm and the first connecting rod, the support or the arm and the first small connecting rod, the connecting rod and the first small connecting rod respectively forming jointed limbs, and the second small connecting rod connected via a joint on the connecting rod and on the arm, wherein the second small connecting rod and the arm form one said jointed limb and the second small connecting rod and the connecting rod form another said jointed limb, the second small connecting rod forming an operation forearm, wherein the jointed limb comprises at least first and second rigid segments connected by a flexible mechanical joint, said flexible joint being formed by fibers and including at least one measurement element separate from said fibers, wherein said fibers which comprise said flexible joint receive, and are constructed to withstand, mechanical stress transmitted from one of said rigid segments to another of said rigid segments, such that said flexible joint bears said mechanical stress transmitted between said rigid segments, wherein end portions of said fibers comprising said flexible joint are fixed in each of the rigid segments, wherein said fibers comprising said flexible joint are corded to form at least two cables disposed parallel to each other, wherein a length of each said cable in a direction orthogonal to an axis of rotation of the flexible joint is larger than a width of said at least two cables, wherein the cables are constructed to bend, and wherein said cables are disposed on sides of the measuring element.

11. The robot or haptic interface according to claim 10, wherein the operation element is one of a stylus or a thimble designed to receive the end of a finger.

12. A robot or haptic interface comprising:

two structures arranged one on top of the other, wherein free ends of two operation forearms are coupled to an operation element to form a jointed limb, wherein each said structure comprises
 a base provided with one or two arms;
 a mobile support mounted via a joint on the base, the mobile support forming a jointed limb with the base; and
 a jointed parallelogram comprising an arm, a connecting rod parallel to the arm and first and second parallel small connecting rods, the arm connected via a joint on the mobile support, the arm and the mobile support forming a one said jointed limb, the first small connecting rod connected via a joint on the mobile support or the arm and the first connecting rod, the support or the arm and the first small connecting rod, the connecting rod and the first small connecting rod respectively forming jointed limbs, and the second small connecting rod connected via a joint on the connecting rod and on the arm, wherein the second small connecting rod and the arm form one said jointed limb and the second small connecting rod and the connecting rod form another said jointed limb, the second small connecting rod forming an operation forearm, wherein the jointed limb comprises at least first and second rigid segments connected by a flexible mechanical joint, said flexible joint being formed by fibers and including at least one measurement element separate from said fibers, wherein said fibers which comprise said flexible joint receive, and are constructed to withstand, mechanical stress transmitted from one of said rigid segments to another of said rigid segments, such that said flexible joint bears said mechanical stress transmitted between said rigid segments, wherein end portions of said fibers comprising said flexible joint are fixed in each of the rigid segments, wherein said fibers comprising said flexible joint are corded to form at least two cables disposed parallel to each other, wherein a length of each said cable in a direction orthogonal to an axis of rotation of the flexible joint is larger than a width of said at least two cables, wherein the cables are constructed to bend, and wherein said cables are disposed on sides of the measuring element.

13. A robot or haptic interface comprising:

three structures regularly distributed angularly around an axis, wherein ends of the forearms are all oriented from one side and support a platform that supports an operation element, wherein each said structure comprises
 a base provided with one or two arms;
 a mobile support mounted via a joint on the base, the mobile support forming a jointed limb with the base; and a jointed parallelogram comprising an arm, a connecting rod parallel to the arm and first and second parallel small connecting rods, the arm connected via a joint on the mobile support, the arm and the mobile support forming a one said jointed limb, the first small connecting rod connected via a joint on the mobile support or the arm and the first connecting rod, the support or the arm and the first small connecting rod, the connecting rod and the first small connecting rod respectively forming jointed limbs, and the second small connecting rod connected via a joint on the connecting rod and on the arm, wherein the second small connecting rod and the arm form one said jointed limb and the second small connecting rod and the connecting rod form another said jointed limb, the second small connecting rod forming an operation forearm, wherein the jointed limb comprises at least first and second rigid segments connected by a flexible mechanical joint, said flexible joint being formed by fibers and including at least one measurement element separate from said fibers, wherein said fibers which comprise said flexible joint receive, and are constructed to withstand, mechanical stress transmitted from one of said rigid segments to another of said rigid segments, such that said flexible joint bears said mechanical stress transmitted between said rigid segments, wherein end portions of said fibers comprising said flexible joint are fixed in each of the rigid segments, wherein said fibers comprising said flexible joint are corded to form at least two cables disposed parallel to each other, wherein a length of each said cable in a direction orthogonal to an axis of rotation of the flexible joint is larger than a width of said at least two cables, wherein the cables are constructed to bend, and wherein said cables are disposed on sides of the measuring element.

14. A robot comprising:

a base on which are arranged three mobile supports constructed to turn about three axes angularly and regularly, each support forming, with the base, a jointed limb; and three first segments jointed on the mobile supports, forming with them one or more said jointed limbs, three second segments jointed by a first end respectively on the three first segments, said second segments forming, with said first segments, one or more said jointed limbs, said second segments supporting, at a second end, a platform supporting an operation element, wherein the jointed limb comprises at least first and second rigid segments connected by a flexible mechanical joint, said flexible joint being formed by fibers and including at least one measurement element separate from said fibers, wherein said fibers which comprise said flexible joint receive, and are constructed to withstand, mechanical stress transmitted from one of said rigid segments to another of said rigid segments, such that said flexible joint bears said mechanical stress transmitted between said rigid segments, wherein end portions of said fibers comprising said flexible joint are fixed in each of the rigid segments, wherein said fibers comprising said flexible joint are corded to form at least two cables disposed parallel to each other, wherein a length of each said cable in a direction orthogonal to an axis of rotation of the flexible joint is larger than a width of said at least two cables, wherein the cables are constructed to bend, and wherein said cables are disposed on sides of the measuring element.

15. A robot or haptic interface comprising:

at least two structures each placed on a shared base adapted to be arranged on a user's hand, wherein each said structure comprises
a base provided with one or two arms;
a mobile support mounted via a joint on the base, the mobile support forming a jointed limb with the base; and
a jointed parallelogram comprising an arm, a connecting rod parallel to the arm and first and second parallel small connecting rods, the arm connected via a joint on the mobile support, the arm and the mobile support forming a one said jointed limb, the first small connecting rod connected via a joint on the mobile support or the arm and the first connecting rod, the support or the arm and the first small connecting rod, the connecting rod and the first small connecting rod respectively forming jointed limbs, and the second small connecting rod connected via a joint on the connecting rod and on the arm, wherein the second small connecting rod and the arm form one said jointed limb and the second small connecting rod and the connecting rod form another said jointed limb, the second small connecting rod forming an operation forearm, wherein the jointed limb comprises at least first and second rigid segments connected by a flexible mechanical joint, said flexible joint being formed by fibers and including at least one measurement element separate from said fibers, wherein said fibers which comprise said flexible joint receive, and are constructed to withstand, mechanical stress transmitted from one of said rigid segments to another of said rigid segments, such that said flexible joint bears said mechanical stress transmitted between said rigid segments, wherein end portions of said fibers comprising said flexible joint are fixed in each of the rigid segments, wherein said fibers comprising said flexible joint are corded to form at least two cables disposed parallel to each other, wherein a length of each said cable in a direction orthogonal to an axis of rotation of the flexible joint is larger than a width of said at least two cables, wherein the cables are constructed to bend, and wherein said cables are disposed on sides of the measuring element.

* * * * *